United States Patent
Scheiff et al.

(10) Patent No.: US 12,334,741 B2
(45) Date of Patent: Jun. 17, 2025

(54) ELECTRICALLY HEATED, HYBRID HIGH-TEMPERATURE METHOD

(71) Applicants: BASF SE, Ludwigshafen am Rhein (DE); thyssenkrupp AG, Essen (DE); thyssenkrupp Uhde GmbH, Dortmund (DE)

(72) Inventors: Frederik Scheiff, Ludwigshafen (DE); Grigorios Kolios, Ludwigshafen (DE); Andreas Bode, Ludwigshafen (DE)

(73) Assignees: BASF SE, Ludwigshafen am Rhein (DE); thyssenkrupp AG, Essen (DE); thyssenkrupp Uhde GmbH, Dortmund (DE)

( * ) Notice: Subject to any disclaimer, the term of this patent is extended or adjusted under 35 U.S.C. 154(b) by 711 days.

(21) Appl. No.: 17/596,030

(22) PCT Filed: May 28, 2020

(86) PCT No.: PCT/EP2020/064779
§ 371 (c)(1),
(2) Date: Dec. 2, 2021

(87) PCT Pub. No.: WO2020/245016
PCT Pub. Date: Dec. 10, 2020

(65) Prior Publication Data
US 2022/0352721 A1   Nov. 3, 2022

(30) Foreign Application Priority Data

Jun. 5, 2019 (EP) .................................. 19178437

(51) Int. Cl.
*H02J 3/38* (2006.01)
*C01B 3/24* (2006.01)
(Continued)

(52) U.S. Cl.
CPC ................ *H02J 3/381* (2013.01); *C01B 3/24* (2013.01); *H02J 3/28* (2013.01); *H02J 15/008* (2020.01);
(Continued)

(58) Field of Classification Search
None
See application file for complete search history.

(56) References Cited

U.S. PATENT DOCUMENTS

| | | |
|---|---|---|
| 2,958,584 A | 11/1960 | Johnson et al. |
| 4,558,494 A | 12/1985 | Kraus |

(Continued)

FOREIGN PATENT DOCUMENTS

| | | |
|---|---|---|
| DE | 102008043606 A1 | 5/2010 |
| DE | 102012023832 A1 | 6/2014 |

(Continued)

OTHER PUBLICATIONS

"1,3-Butadien", Wikipedia, last edited on May 2, 2020, 7 pages. URL: https://de.wikipedia.org/w/index.php?title=1,3-Butadien&oldid=199535563.

(Continued)

*Primary Examiner* — John J Figueroa
(74) *Attorney, Agent, or Firm* — Grüneberg and Myers PLLC

(57) ABSTRACT

A method of continuously performing one or more heat-consuming processes, where at least one heat-consuming process is electrically heated. The maximum temperature in the reaction zone of the heat-consuming process is higher than 500° C., at least 70% of products of the heat-consuming process are continuously processed further downstream and/or fed to a local energy carrier network, and the electrical energy required for the heat-consuming process is drawn from an external power grid and from at least one local (Continued)

power source. The local power source is fed by at least one local energy carrier network and by products from the heat-consuming process. The local energy carrier network stores natural gas, naphtha, hydrogen, synthesis gas, and/or steam as energy carrier, and has a total capacity of at least 5 GWh. The local energy carrier network is fed with at least one further product and/or by-product from at least one further chemical process.

14 Claims, 5 Drawing Sheets

(51) Int. Cl.
 *H02J 3/28* (2006.01)
 *H02J 15/00* (2006.01)

(52) U.S. Cl.
 CPC .......................... *C01B 2203/0266* (2013.01); *C01B 2203/066* (2013.01); *C01B 2203/1241* (2013.01); *H02J 2300/30* (2020.01)

(56) References Cited

U.S. PATENT DOCUMENTS

| | | | |
|---|---|---|---|
| 4,668,494 A | 5/1987 | Van Hook | |
| 4,776,171 A | 10/1988 | Perry, Jr. et al. | |
| 6,096,173 A | 8/2000 | Von Hippel et al. | |
| 7,288,690 B2 | 10/2007 | Bellet et al. | |
| 8,522,573 B2* | 9/2013 | Golben | C10L 1/04 422/600 |
| 10,351,422 B2 | 7/2019 | Machhammer et al. | |
| 2005/0065392 A1 | 3/2005 | Peterson et al. | |
| 2008/0303348 A1 | 12/2008 | Witters | |
| 2009/0321244 A1* | 12/2009 | Smith | B01J 35/45 422/600 |
| 2011/0081586 A1 | 4/2011 | Mcalister | |
| 2011/0214425 A1 | 9/2011 | Lang et al. | |
| 2012/0186252 A1 | 7/2012 | Schmidt | |
| 2012/0241677 A1* | 9/2012 | Perkins | C10J 3/506 252/373 |
| 2015/0298093 A1* | 10/2015 | Markowz | F01K 21/04 585/539 |
| 2015/0321912 A1* | 11/2015 | Machhammer | C01B 3/28 423/650 |
| 2016/0108809 A1* | 4/2016 | Markowz | F01K 23/10 60/39.182 |
| 2018/0066199 A1* | 3/2018 | Krylowicz | C10J 3/721 |

FOREIGN PATENT DOCUMENTS

| | | |
|---|---|---|
| DE | 102013209883 A1 | 12/2014 |
| EP | 3249027 A1 | 11/2017 |
| WO | WO-2014/090914 A1 | 6/2014 |

OTHER PUBLICATIONS

"Benzol", Wikipedia, last edited on Apr. 20, 2020, 11 pages. URL: https://de.wikipedia.org/w/index.php?title=Benzol&oldid=199100597.
"Butene", Wikipedia, last edited on Sep. 3, 2019, 5 pages. URL: https://de.wikipedia.org/w/index.php?title=Butene&oldid=191929887.
"Cyanwasserstoff", Wikipedia, last edited on Apr. 23, 2020, 5 pages. URL: https://de.wikipedia.org/w/index.php?title=Cyanwasserstoff&oldid=199198613.
"Dampfturbine", Wikipedia, last edited on Jan. 11, 2022, 10 pages. URL:https://de.wikipedia.org/w/index.php?title=Dampfturbine&oldid=219069299.
"Ethen", Wikipedia, last edited on Apr. 23, 2020, 11 pages. URL: https://de.wikipedia.org/w/index.php?title=Ethen&oldid=199192096.
"Formaldehyd", Wikipedia, last edited on May 3, 2020, 16 pages. URL: https://de.wikipedia.org/w/index.php?title=Formaldehyd&oldid=199572039.
"Kohlenstoffmonoxid", Wikipedia, last edited on Apr. 19, 2020, 19 pages. URL: https://de.wikipedia.org/w/index.php?title=Kohlenstoffmonoxid&oldid=199031788.
"Propen", Wikipedia, last edited on Oct. 1, 2019, 7 pages. URL: https://de.wikipedia.org/w/index.php?title=Propen&oldid=192770628.
"Styrol", Wikipedia, last edited on Apr. 21, 2020, 11 pages. URL: https://de.wikipedia.org/w/index.php?title=Styrol&oldid=199119904.
"Synthesegas", Wikipedia, last edited on Mar. 10, 2020, 5 pages. URL: https://de.wikipedia.org/w/index.php?title=Synthesegas&oldid=197642178.
"Wasserstoff", Wikipedia, last edited on Mar. 15, 2020, 28 pages. URL: https://de.wikipedia.org/w/index.php?title=Wasserstoff&oldid=197790800.
European Search Report for EP Patent Application No. 19178437.0, Issued on Dec. 4, 2019, 3 pages.
Grigorios Kolios, "Regenerative Fixed-Bed Processes: Approximative Analysis and Efficient Computation of the Cyclic Steady State", Habilitation thesis approved by the Faculty of Energy, Process Engineering and Biotechnology, University of Stuttgart, Apr. 10, 2013, 187 pages, relevant parts in English.
International Search Report for PCT Patent Application No. PCT/EP2020/064779, Issued on Jul. 8, 2020, 5 pages.
Written Opinion for PCT Patent Application No. PCT/EP2020/064779, Issued on Jul. 8, 2020,12 pages.

\* cited by examiner

ELECTRICALLY HEATED, HYBRID HIGH-TEMPERATURE METHOD

CROSS-REFERENCE TO RELATED APPLICATIONS

This application is the National Stage entry under § 371 of International Application No. PCT/EP2020/064779, filed on May 28, 2020, and which claims the benefit of priority to European Application No. 19178437.0, filed on Jun. 5, 2019. The content of each of these applications is hereby incorporated by reference in its entirety.

BACKGROUND OF THE INVENTION

Field of the Invention

The invention relates to a method of continuously performing one or more heat-consuming processes, wherein the at least one heat-consuming process is electrically heated, the maximum temperature in the reaction zone of the heat-consuming process is greater than 500° C., at least 70% of the products of the at least one heat-consuming process are continuously processed further in downstream processes and/or fed to a local energy carrier grid, and the electrical energy required for the at least one heat-consuming process is drawn from an external power grid and from at least one local power source, with feeding of the at least one local power source from at least one local energy carrier grid to an extent of at least 50% of its annual energy requirement and feeding of said at least one local power source with products from the heat-consuming process to an extent of not more than 50% of its annual energy requirement, with storage of natural gas, naphtha, hydrogen, synthesis gas and/or steam as energy carrier in at least one local energy carrier grid, with feeding of the at least one local energy carrier grid with at least one further product and/or by-product from at least one further chemical process, and with a total capacity of the local energy carrier grid of at least 5 GWh. The invention further relates to the use of this method as minute reserve for the public power grid and to the use of local energy carrier grid of chemical sites for storage of electrical energy.

Description of Related Art

One of the greatest problems in making it possible to utilize renewable energies is the lack of storage capacities to absorb variations that occur constantly owing to the significant dependence on weather influences.

The problem of storing renewable energy has been a topic of interest since the 1980s. In order to be able to supply energy users, for example the chemical industry, with the power generated on demand in spite of use of renewable energies, energy suppliers have considered measures including the following:

U.S. Pat. No. 4,776,171 describes an energy generation and management system consisting of multiple renewable energy sources and multiple energy storage sources, and also multiple control and distribution stations, in order to meet the demand from industry.

US 2011/0081586 describes a combination of a renewable energy source with an electrochemical or electrolytic cell in which the electrochemical or electrolytic cell can balance out the fluctuations in the renewable energy source and hence make it continuously utilizable.

US 2008/0303348 discloses a power plant that makes use exclusively of renewable energies and nevertheless enables demand-dependent control. US 2008/0303348 describes the combination of wind energy, solar energy and the energy which is obtained from the burning of biomass. It is stated that the power plant can switch seamlessly and spontaneously between the three energy sources in order to meet the corresponding demand from industry inexpensively at any time.

The focus of these disclosures is on being able to supply the users with power on demand—in spite of use of fluctuating renewable energy. Consequently, the user stipulates the amount of power production and the weather determines the portion of the renewably generated power.

US 2012/0186252 describes a method of generating and establishing electricity which is not matched exclusively to the demand from external users. According to US 2012/0186252, a conventional power plant is operated with fossil and/or renewable fuels and the power generated is fed into the public power grid if there is a demand for power. In the periods in which power demand is low, the power generated is used internally for production of hydrogen which can subsequently be reacted with carbon dioxide in a Sabatier process to give the renewable fuel methane. The hydrogen generator can thus attenuate the slow dynamics of the local power source through a varying production conduit. Moreover, in the periods in which surplus power is available, power from the public grid is used to operate the internal hydrogen generator. The hydrogen generator is accordingly operated depending on the power demand and power supply; when power demand is low the power for the generator comes from a local source, and in periods of surplus power from the public power grid. A disadvantage of this method is that the hydrogen generator is being operated as a heat-consuming process with varying production output since it serves to adjust the power output from the conventional power plant to the demand from the grid. There is no disclosure of a mode of operation which—as required in integrated sites for the chemical industry—assures constant production output of the hydrogen generator.

U.S. Pat. No. 4,558,494 describes the direct utilization of solar energy for preparation of ammonia. The heat required for this endothermic process is provided by a heat transfer fluid which is heated by solar energy if solar energy is available, and by combustion of the ammonia produced if no solar energy is available. U.S. Pat. No. 4,668,494 accordingly discloses the use of two separate energy sources, one solar and one oxidative, for an endothermic chemical process; but there is no description of the use of an electrical energy source.

The proportion of renewable energies in power generation, which, in Germany in 2016, was already 50% based on installed power and 30% based on power generation (date: Feb. 26, 2017; "Energie für Deutschland, Fakten, Perspektiven and Positioner im globalen Kontext" [Energy for Germany, Facts, Perspectives and Positions in a Global Context], Weltenergierat—Deutschland e.V., 2017) will distinctly increase again in the next few years since the technologies for power generation based on renewable energies are and will remain economically attractive firstly on account of rising costs for fossil energy carriers and secondly owing to market regulation measures.

In the near future, there will be ever more common occurrences of power spikes as a result of feeding from the increasing shares of renewable energies from sun, wind and water into the power grid, which can be accepted only incompletely by power consumers. These power peaks, called surplus power, must be absorbed by controlled activation of power-consuming processes in order to assure grid stability.

The consumers provide what is called negative control power. Depending on the activation time required, control power is defined as secondary control power and minute reserve power. The provision of a capacity as control power, called the control power reserve, is remunerated regardless of whether the capacity is demanded or not. In 2016, the average contracted negative secondary control power and minute reserve power were each around 1900 MW. In Germany, in 2016, the payment for the control power reserve for primary control power, secondary control power and minute reserve power was nearly €200 million (2017 monitoring report from the Bundesnetzagentur, the German federal power grid agency).

The payment for the utilization of the control power is determined via the balance energy price. The balance energy price on the power market may be well below its generation costs or may be supplied at prices lower than for a fossil fuel with the same calorific value, based on its energy content, or for free (i.e. without payment) or even at negative prices. In 2016, the average balancing energy price was −14.12 €/MWh. This means that consumers that accepted surplus power additionally received a credit note. The sum total of the credit notes in 2016 was about €10.78 million.

In Germany, the renewable energies act guarantees priority feeding into the power grid for the producers of renewable energies. If there are situations in which, in spite of all grid optimization and grid development measures, down-regulation of renewable electricity generators is unavoidable owing to overcapacity or lack of transport capacity, this has to be compensated for by the grid operator operating the grid that caused the down-regulation. In 2016, 3743.2 GWh were affected by these so-called feed management measures, which had to be compensated for at a cost of about €643 million (2017 monitoring report from the Bundesnetzagentur).

There is increasing cost pressure on thermal power plants that serve as baseload power plants since the feeding of wind and photovoltaic leads to a significant reduction in the minimum residual power load (by 18 to 20 GW) in conventional power plants. On the other hand, technical limitations (minimum load and startup time) and the demands of system stability (provision of system services) require conventional minimum generation. Simplified estimates suggest that assurance of system stability currently requires a minimum generation from conventional power plants in the range from 4 to 20 GW. This is required in order to provide sufficient idle power and active power reserve for reaction to the fluctuating feeding of wind and photovoltaic (Statusbericht Flexibilitätsbedarf im Stromsektor [Status Report on Flexibility Requirement in the Power Sector]).

These problems place high demands on the utilizable load range and the reaction time of the power plants. The startup time for brown coal and hard coal power plants is several hours. The startup time of combined cycle power plants is in the region of one hour. Only gas turbine power plants can be started up within a few minutes. Power plant efficiency is 55% to 60% for combined cycle power plants, 42% to 47% for hard coal power plants, 38% to 43% for brown coal power plants, and 34% to 40% for gas turbine power plants. All thermal power plant types have a utilizable load range between 40% to 90% of maximum power, with maximum power plant efficiency in the region of full load. Taking account of these features, the problem addressed is that of connecting consumers with a high continuous power demand to the power grid in order that baseload power plants can be operated at high load with maximum continuity.

At present, short-term power fluctuations are compensated for with the aid of what are called highly dynamic power plants that can absorb the load spike in question within the scope of a system service for the grid operators. Nowadays, this is accomplished essentially by pumped and pressurized storage power plants, and gas and steam power plants. In the former case, installable capacity in Germany has already been essentially exhausted. The installation and operation of gas and steam power plants for peak load compensation is barely of interest to energy suppliers since the amortization periods thereof are much too long because their annual operation time is too short. Moreover, compressed air storage power plants have a relatively low efficiency at about 40% to 50%.

In the case of frequency control in electrical grids, control circuits of different speed are used: primary control with a response time of less than 30 s, secondary control with a response time of less than 5 min, and finally tertiary control that permits a longer response time. Primary control is triggered automatically and acts directly on the state of operation of running power plants. Secondary control is likewise triggered automatically and can activate reserve capacities from standby mode. Tertiary control (or minute reserve) is generally activated by organizational measures. Secondary control and minute reserve may be positive (in the event of elevated power demand) or negative (in the event of reduced power demand). Positive secondary control and minute reserve are typically activated by switching on reserve power plants. Negative minute reserve requires an energy consumer. According to current state of the art, as well as pumped storage power plants, this purpose is also served by changes in capacity of large power plants and combined heat and power plants, and final consumers, for example light arc furnaces or refrigerated warehouses. However, the distribution of capacity thereof is regionally non-uniform (see IDOS report). Moreover, it is likely that the demand for negative minute reserve will increase as a result of the development of renewable energy sources. In 2016, the negative secondary control power called for by the four German grid suppliers was about 710 GWh, and the negative minute reserve totaled about 54 GWh (see monitoring report from the Bundesnetzagentur 2017, p. 158).

A further means of buffering differences between supply and demand of electrical power is thermal storage means. Thermal storage means can store energy in the form of heat. The heat can be sourced, for example, from flue gases from combustion processes, from electrical heaters, from solar collectors. Electrical energy can be produced from the heat stored in a heat-to-power process. For that reason, the higher the temperature at which the heat is generated, the more effective the heat storage means. Heat storage means can be divided into three main categories, Sensible heat storage means store heat in the form of a tangible increase in temperature; in latent heat storage means, the energy is stored in the phase transition of the storage medium. Thermochemical and sorption storage means store heat energy reversibly as heat of chemical reaction or ad-/absorption. As sensible heat storage means are liquid or solid materials having high heat capacity. Standard liquids are water for the temperature range from 0° C. to 100° C., heat transfer oil for the temperature range from 0° C. to 400° C., nitrate salts for the temperature range from 250° C. to 570° C., carbonate salts for the temperature range from 450° C. to 850° C., and sodium for the temperature range from 100° C. to 800° C.

Standard solid heat storage means are moist gravel beds for the temperature range from 0° C. to 100° C., concrete for the temperature range from 0° C. to 500° C., gravel or sand, granite, or iron alloys for the temperature range from 0° C. to 800° C. and brick for the temperature range from 0° C. to 1000° C. Latent heat storage means used are materials which, within their working range, change their state of matter either between solid and liquid or between liquid and gaseous.

Standard materials are water, which is used at 0° C. as solid-liquid latent heat storage means, and in the temperature range from 100° C. to 350° C. as vapor-liquid latent heat storage means. Further solid-liquid latent heat storage means are crude paraffin at about 34° C., eicosane at about 37° C., lauric acid at about 44° C., myristic acid at about 54° C., stearic acid at about 70° C., mirabilite ($Na_2SO_4 \cdot 10H_2O$) at about 32° C., pentahydrate ($Na_2S_2O_3 \cdot 5H_2O$) at about 48° C., barium hydroxide octahydrate ($Ba(OH)_2 \cdot 8H_2O$) at about 78° C., eutectic sodium chloride/magnesium chloride mixture at about 450° C. or eutectic sodium chloride/magnesium fluoride mixture at about 832° C. Thermochemical storage means utilize reversible reactions. Such reactions may be the dehydration of metal hydrides, for example $MgH_2$, $Mg_2NiH_4$, $Mg_2FeH_6$, the dehydration of metal hydroxides, for example $Mg(OH)_2$, $Ca(OH)_2$, $Ba(OH)_2$, the decarboxylation of metal carbonates, for example $MgCO_3$, $PbCO_3$, $CaCO_3$, $BaCO_3$, the partial reduction of oxides of multivalent metals, for example $PbO_2$, $Sb_2O_5$, $MnO_2$, $Mn_2O_3$, $CuO$, $Fe_2O_3$. Sorption storage means used are salt hydrates, for example $MgSO_4 \cdot 7H_2O$, $MgCl_2 \cdot 6H_2O$, $CaCl_2 \cdot 6H_2O$, $CuSO_4 \cdot 5H_2O$, $CuSO_4 \cdot H_2O$, or ammoniates of metal chlorides, for example $CaCl_2 \cdot 8NH_3$, $CaCl_2 \cdot 4NH_3$, $MnCl_2 \cdot 6NH_3$. Finally, endothermic high-temperature processes that afford hydrogen-rich products, for example steam reforming or the pyrolysis of natural gas, can be utilized as thermochemical storage means. The hydrogen can be utilized either physically or for energy purposes.

An important field of thermal storage media is that of solar-thermal power plants. Salt melts, thermal oils and concrete storage media are used here. In addition, heat storage media used in power plants can improve load flexibility with regard to minimum load and the rate of change of load. For example, steam storage media are used to provide control power.

In the discussions relating to the energy revolution and the reduction of CO2 emissions for the protection of the climate, the electrification of chemical processes and especially the use of highly endothermic chemical reactions as secondary control means and minute reserve for surplus power is still of minor significance.

Electrical power is currently used as the energy source of choice mainly for noncatalytic gas/solid and solid-state reactions if large heat flows have to be introduced at a very high temperature level. Typical applications are metallurgical furnaces [Ullmann: Metalurgical Furnaces]. The only relevant gas phase processes that have become established on the industrial scale have been the plasma process for preparation of acetylene from methane [Baumann, Angewandte Chemie, issue B, volume 20 (1948), pages 257-259, 1948] and the process for preparing reducing gases in the steel industry. The literature does include further pointers to the use of electrical energy sources in gas phase processes, but it has not been possible to date to develop any applications usable economically on the industrial scale from these.

Processes with electrical heating are described for the preparation of hydrogen cyanide (HCN) from alkanes, especially from methane and ammonia. U.S. Pat. No. 2,958,584 discloses the preparation of HCN from propane and ammonia in an electrically heated fluidized bed of carbon particles, while U.S. Pat. No. 6,096,173 describes the preparation of hydrogen cyanide as a gas phase reaction of methane and ammonia using a corona discharge.

U.S. Pat. No. 7,288,690 describes a process for steam-cracking of hydrocarbons, wherein the cracking tubes are electrically heated. The improvement which is achieved by this invention is essentially the utilization of heat and power integration in order to simultaneously generate heat and electricity from the combustion of a fuel. The fuel is preferably combusted in a gas turbine that drives a generator. The electrical power generated is used to heat the cracking tubes. The tangible heat present in the combustion offgases serves to preheat the feed mixture. A disadvantage of this solution is the coupling between the energy streams available for the electrical heating of the cracking tubes and for the preheating of the feed mixture. This coupling forces a suboptimal state of operation of one of the two process stages. Moreover, the applicability of the invention is limited to non-heat-integrated processes.

DE 10 2013 209 883 describes an integrated plant for electrochemical preparation of hydrogen cyanide with a batchwise mode of operation, which can adapt its process output to the external power supply by means of weather forecasting. In an analogous manner, DE 10 2012 023 832 describes an integrated dynamic plant for electrochemical preparation of ethyne. The respective reactor is supplied with electrical energy via the external power grid and via a local power source, wherein the local power source directly utilizes a hydrogen-rich offgas stream from the production of hydrogen cyanide or ethyne without intermediate storage for power production. Power sources used may be fuel cell and gas turbine power plants, or combined cycle power plants. Hydrocarbons and hydrogen are stored; these storage means have a capacity of hydrogen that can be produced within 48 hours with the aid of this plant (about 5000 MWh). From the storage means, the hydrocarbons and hydrogen are supplied to the natural gas grid taking account of the Wobbe index, or the hydrocarbons are guided back into the reactor. There is no disclosure of use of the stored gases for operation of the local power source.

As a result of the dynamic mode of operation, the disadvantage arises in operational reliability, in that highly reactive substances capable of breakdown, such as ethyne and hydrogen cyanide, have to be stored in order to compensate for the fluctuating production volumes. A further disadvantage is that the frequent startup and shutdown operations cause the reactors to undergo significant temperature fluctuations that have an adverse effect on their lifetime and operational reliability. A further disadvantage is that the apparatus for introduction of a gas into a natural gas grid entails considerable additional expenditure on machinery and apparatus that is not required for performance of the process. A further disadvantage is that the process dynamics, especially those of the separation stages, and the planning intervals for the weather forecasting are too long to utilize the process as a secondary or tertiary reserve.

In addition, there have also been descriptions of the use of a plasma generator for the preparation of synthesis gas (37 L. Kerker, R, Müller: "Das Plasmareforming-Verfahren zur Erzeugung von Reduktionsgasen" [The Plasma Reforming Process for Generation of Reduction Gases], Stahl Eisen 104, (1984) no. 22, 1137) and the utilization of electrical or electromagnetic processes for decomposition of hydrocarbons (Hässinger, P., Lohmüller, R. and Watson, A. M. 2000. Hydrogen, 2. Production. Ullmann's Encyclopedia of Industrial Chemistry).

At present, many important high-temperature processes, however, are conducted exclusively using energy sources that are fed via oxidative processes (autothermally and/or allothermally). The disadvantages of these oxidative processes, i.e. raw material dependence and limited availability of the raw materials, and the CO2 emission associated with the oxidative processes, are sufficiently well-known. On the industrial scale, these energy-intensive processes proceed continuously and therefore require constant supply of heat. The energy required by these processes in Germany is estimated at 300 to 600 TWh. This corresponds roughly to the current net power generation in Germany. Endothermic high-temperature processes thus have a significant capacity to absorb surplus power.

Some important heat-consuming processes are high-temperature processes, i.e. processes that are executed at temperatures between 500 and 2500° C. Representatives of these very energy-intensive processes include steam reforming and dry reforming, dehydrogenations, for example of primary alcohols to aldehydes, of secondary alcohols to ketones, of alkanes to alkenes and of cycloalkanes to cycloalkenes, the preparation of hydrogen cyanide by formamide cleavage or from methane and ammonia, the preparation of nitrogen monoxide from air, the steamcracking or pyrolysis of hydrocarbons, and the thermolysis of water. Steam reforming and dry reforming are processes for preparing synthesis gas, a mixture of carbon monoxide and hydrogen, from carbon-containing energy carriers, for example natural gas, light gasoline, methanol, biogas or biomass, and water or carbon dioxide. The steamcracking of hydrocarbons is the industrially established process for preparing short-chain olefins, especially ethylene and propylene, and aromatic compounds from hydrocarbon-containing energy carriers, for example from shale gas, naphtha, liquefied gases. This process proceeds in a kinetically controlled regime with short reaction times. Pyrolysis is a process in which hydrocarbons are converted to their stable carbon and hydrogen end products. This process proceeds in an equilibrium-controlled regime with longer residence times.

According to the prior art, endothermic high-temperature processes such as steamcracking or steam reforming require a heat input well above the heat required by the endothermic reaction. Typically, the surplus heating output introduced is 80% to 200% based on the heat required by the endothermic reaction. In integrated chemical sites, the surplus heating power is exported to downstream stages, for example in order to generate steam at different pressure levels. In this way, it is possible to increase the thermal efficiency of such plants to 90% or more. However, a disadvantage of these processes is that the primary energy demand and the associated greenhouse gas emissions are much higher than the actual requirement of the high-temperature reaction. A further disadvantage results from the rigid energy coupling between different plants in an integrated site; the effect of these couplings is that the operating point of the individual plants can be adjusted only within tight limits.

In order to make chemical production utilizable for the purposes of the energy revolution as a sink for surplus power from renewable energy sources, concepts for electrical heating of energy-consuming chemical processes are required. Since these processes are generally operated continuously, the energy supply has to be decoupled from the volatility of the surplus power availability. As well as the incorporation of surplus power, at least one further energy source is accordingly required.

One way of achieving the supply of heat to the reactor in a hybrid manner, i.e. either in a fossil-heated or electrical-based manner, is disclosed in WO 2014/090914. WO 2014/090914 gives the first pointer to use chemical processes as minute reserve using surplus power. A method of performing heat-consuming high-temperature processes is described, wherein the total energy required, on annual average, comes from at least two different energy sources: at least one electrical energy source which provides between 0% and 100% of the total energy required, especially using surplus power, and a further non-electrical energy source that provides any residual energy required. A major challenge in the case of this concept is the stress on apparatus on changeover between the two energy sources, and also dynamic changeover with minimum loss, i.e. without losses of conversion and selectivity. A further disadvantage of this solution can be that it may be necessary to install two independent apparatuses for generation of heat into the region of the process, which are exposed to high temperatures. This increases the complexity and propensity of the process to faults.

EP3249027 claims a reduced-emissions process for preparation of olefins by steamcracking of hydrocarbons. The cracking tubes can be heated here either by means of the heat of combustion from a fuel or by electrical heating. With constant overall output, it is possible to vary the proportion of electrical heating to heat of combustion. Also conceivable is the parallel connection of cracking tubes that are heated exclusively electrically or exclusively by heat of combustion. A disadvantage of this invention is the fact that two different heat sources have to be installed in the cracking furnace.

SUMMARY OF THE INVENTION

It is therefore an object of the present invention to make chemical high-temperature processes utilizable for the purposes of the energy revolution as a sink for surplus power from renewable energy sources. A further object is that of providing chemical processes as energy user in the event of negative secondary control and/or minute reserve for frequency control in electrical grids. A further object is that of flexibilizing the endothermic chemical process such that it is able to choose the power source depending on the wholesale power price and hence enables economic optimization.

A further object is that of minimizing the target variance of the power input into the endothermic process on changeover between the power sources, such that production output is unchanged. A further object is for the local power sources to have maximum efficiency and minimum $CO_2$ output.

A further object is to integrate the local power sources into the integrated mass and heat system of the endothermic process. If local power sources that can be switched on or off rapidly are used, it is necessary for energy carriers that can be opened up or shut off sufficiently rapidly to be available.

It was a further object of the present invention to find ways that enable an increase in flexibility with regard to storage and utilization of electrical energy compared to the prior art.

In addition, the present invention, in spite of use of surplus power, was to homogenize the production rate of the heat-consuming processes in question and minimize the stress on the machinery and apparatus.

Moreover, the present invention was to improve the plannability of downstream processes by controlling the load on the upstream heat-consuming process, irrespective of the availability of surplus power, via the demand of the downstream processes.

The plant and the method were additionally to have maximum efficiency. In addition, the method of the invention was to be performable using the conventional and widely available infrastructure. Furthermore, the method was to be performable with a minimum number of method steps, and these were to be simple and reproducible.

DETAILED DESCRIPTION OF THE INVENTION

Figure 1:
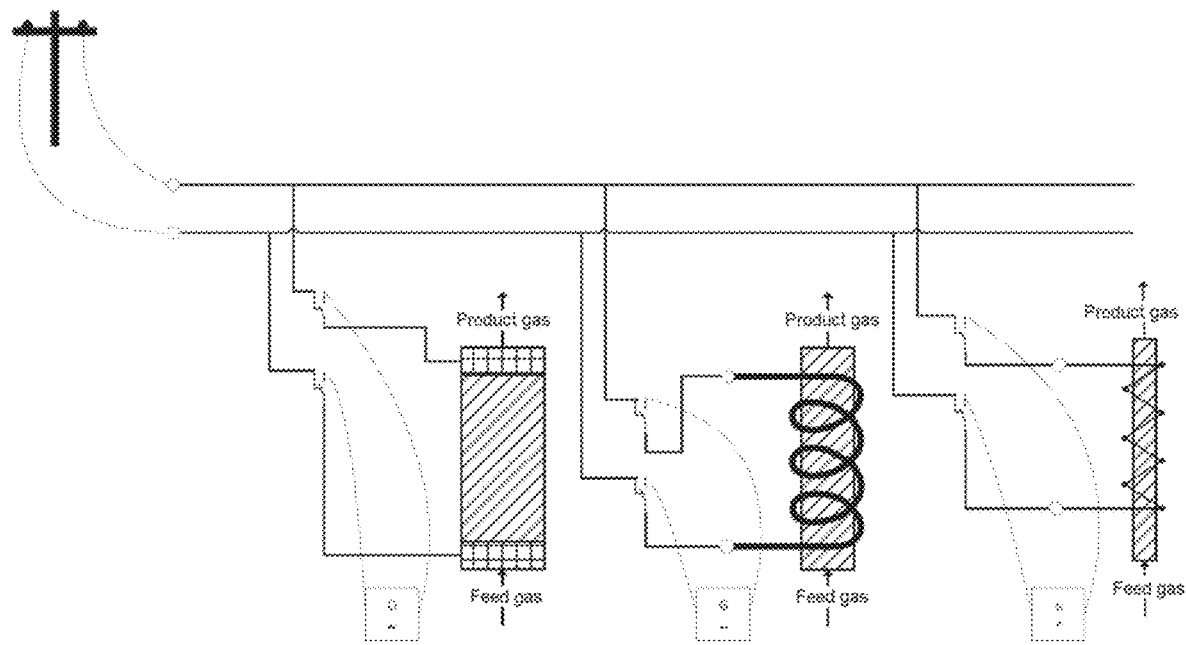
FIG. 1 shows a schematic of a variant of the method of the invention with a directly resistance-heated fluidized bed reactor, an inductively heated fixed bed reactor, and an indirectly resistance-heated fixed bed reactor on an integrated site.

Huge amounts of thermal energy are currently being wasted in the form of offgas and waste heat streams in different industrial processes and pollute the environment. The recycling and utilization of these waste heat streams can significantly improve the energy efficiency and economic efficiency of many process plants in different branches of industry. In integrated sites in the chemical industry, energy carriers available are fluid media that are distributed via associated pipe grids and storage vessels over the entire site (local energy carrier grids). These energy carriers may be raw materials such as natural gas or liquefied gas, commodities such as hydrogen or synthesis gas, and auxiliaries such as steam or compressed air. These local energy carrier grids offer sufficiently high capacity to store mechanical energy, heat and/or combustible materials and to provide these if required, without delay, for the supply of local power sources.

Method

These stated objects are achieved in accordance with the invention by a method of continuously performing one or more heat-consuming chemical processes, wherein the at least one heat-consuming process is electrically heated, the maximum temperature in the reaction zone of the heat-consuming process is greater than 500° C., at least 70% of the products of the at least one heat-consuming process are continuously processed further in downstream processes and/or fed to a local energy carrier grid, and the electrical energy required for the at least one heat-consuming process is drawn from the external power grid and from at least one local power source, with feeding of the at least one local power source from at least one local energy carrier grid to an extent of at least 50% of its annual energy requirement and feeding of said at least one local power source with products from the heat-consuming process without intermediate storage to an extent of not more than 50% of its annual energy requirement, with storage of natural gas, naphtha, hydrogen, synthesis gas and/or steam as energy carrier in the at least one local energy carrier grid, with feeding of the at least one local energy carrier grid with at least one further product and/or by-product from at least one further chemical process, and with a total capacity of the local energy carrier grid of at least 5 GWh.

The present invention further relates to the use of at least one local energy carrier grid of chemical sites for storage of electrical energy, wherein the energy carriers used are natural gas, liquefied gas or naphtha, hydrogen, ammonia, synthesis gas, ethylene, propylene, compressed air and/or steam, and wherein the energy carrier grid has a total capacity of at least 5 GWh.

The local energy carrier grids can be divided into grids/storage means for heat carriers, for example steam, grids/storage means for intermediates, for example hydrogen and synthesis gas, and grids/storage means for raw materials, for example natural gas and naphtha.

Preference is given to using at least two local energy carrier grids.

Preference is given to using at least two different local energy carrier grids for energy carriers selected from the group consisting of energy carriers, preferably water vapor, intermediates, preferably hydrogen and/or synthesis gas, especially hydrogen, and raw materials, preferably natural gas and naphtha, especially natural gas. Preference is given to the two-component combination of heat carriers and intermediates, or the three-component combination of heat carriers, intermediates and raw materials.

Advantageously at least 50%, preferably 70%, especially 90%, of the products of the at least one heat-consuming process are continuously processed further in downstream processes and/or supplied to a local energy carrier grid. Preferably, the percentage product range is 50% to 100%, preferably 70% to 100%, especially 90% to 100%. A downstream process is understood to mean the downstream conversion of the products from the heat-consuming process to further products.

Advantageously, the at least one local power source is fed from a local energy carrier grid to an extent of at least 50% of its annual energy demand; preferably to an extent of at least 70%, further preferably to an extent of at least 80%, further preferably to an extent of at least 90%.

Advantageously, the percentage range is 50 to 100, preferably 70 to 100, further preferably 80 to 100, especially 90 to 100. More preferably, the at least one local power source is fed exclusively from the local energy carrier grid.

Advantageously, the at least one local power source is fed to an extent of not more than 50% of its annual energy demand, preferably to an extent of not more than 20%, more preferably to an extent of not more than 10%, with products that come directly from the heat-consuming process. Advantageously, the percentage range is 50 to 0, preferably 20 to 0, especially 10 to 0.

This means that these products, for feeding of the local power source, are taken directly and without intermediate storage from the heat-consuming process and routed to the local power source. More preferably, no product streams from the heat-consuming process are routed directly and without intermediate storage to the local power source.

The local energy power grids are advantageously fed with at least one further product and/or by-product in each case from at least one further chemical process. These further chemical processes are, for example, olefin processes, synthesis gas processes, partial oxidations, pyrolyses of hydrocarbons, water electrolyses, foundry processes and/or hydrogenations.

For example, the hydrogen energy carrier grid is fed from processes such as steamcracking, steam reforming, methane pyrolysis, styrene synthesis, propane dehydrogenation, synthesis gas production, formaldehyde synthesis. For example, the steam energy carrier grid is fed from processes such as steamcracking, steam reforming, acetylene process, synthesis gas production, acrylic acid synthesis, phthalic anhydride synthesis, maleic anhydride synthesis, ethylene oxide synthesis, formaldehyde synthesis. For example, the hydrocarbon energy carrier grid is fed from the raw materials naphtha, natural gas and liquefied gas.

The endothermic processes, for example steamcracking, steam/dry reforming, styrene synthesis, propane dehydrogenation, butane dehydrogenation, hydrogen cyanide synthesis, methane pyrolysis, are accordingly energy carrier sources and energy carrier users; whereas the exothermic processes, for example maleic anhydride, phthalic anhydride, acrolein and acrylic acid, ethylene oxide, formaldehyde, TDI/MDI, are exclusively energy carrier sources.

Power Source:

The source of the electrical energy required for the heat-consuming process may, at any time of day, depending on the current power supply, come from different sources. Three modes are possible: (i) exclusively from an external power source, especially the public power grid, (ii) exclusively from at least one local power source, or (iii) jointly from one external and from at least one internal local power source.

Preferably, all three modes (i), (ii) and (iii) can at least temporarily provide the entire energy required for the at least one heat-consuming process.

Advantageously, an annual average of 10% to 90% of the energy required, preferably 25% to 75% of the energy required, more preferably 50% to 75% of the energy required, is taken from the external power source. Advantageously, an annual average of 10% to 90% of the energy required, 25% to 75%, more preferably 25% to 50% of the energy required, is taken from the local power source.

Advantageously, the energy required by the heat-consuming process is provided by electrical energy to an extent of at least 50%, preferably to an extent of at least 75%, further preferably to an extent of at least 90%; in particular, the energy required is provided exclusively electrically. Advantageously, the percentage range is 50 to 100, preferably 75 to 100, especially 90 to 100.

Continuous performance advantageously lasts for longer than one day, preferably longer than one week, more preferably longer than one month, more preferably longer than two months, especially longer than six months, in which period the process output varies by not more than 50%, preferably not more than 30%, preferably not more than 20%, especially not more than 10%, based on the maximum process output. Advantageously, the percentage range is 50 to 0, preferably 30 to 0, further preferably 20 to 0, especially 10 to 0.

The process output of the process of the invention is advantageously matched to the reactant demand of the downstream process, i.e. the downstream conversion of the products from the heat-consuming process to further products.

The local energy carrier grids advantageously have a total capacity greater than 5 GWh, preferably greater than 10 GWh, further preferably greater than 20 GWh, especially greater than 50 GWh. Advantageously, the total capacity is in the range from 10 GWh to 1000 GWh, preferably from 20 GWh to 500 GWh, more preferably from 50 GWh to 200 GWh.

External Power Source:

The external power source refers to the power grid; this also includes an integrated system power plant, especially an integrated system power plant having a startup time of greater than 15 min.

The term "power grid" relates to all or a particular part of a grid of transmission lines, substations and local distribution grids that enable the transport and regulation of power between the different physical nodes of the grid and the different commercial, private and large-scale consumers connected to the grid.

The difference between the external power source and the local internal power source is that the power generated by the external power source is fed into a power grid from which many users can draw power. The local internal power source is assigned only to a few chemical, heat-consuming processes, preferably 1 to 10 processes, further preferably 1 to 5 processes, especially 1 to 3 processes. The power produced in the internal local power source is transported through local power lines that are operated independently of the public power grid with regard to frequency and voltage. Thus, the power produced in the internal local power source is fed into the public power grid advantageously to an extent of less than 20%, based on the total electrical energy produced in the internal power source, preferably less than 10%. Advantageously, the percentage range is 20 to 0, preferably 10 to 0. More preferably, the power produced in the internal local power source is not fed into a public power grid.

At times of low exploitation of the heat-consuming processes and/or high external power demand, the local power sources can release power to the external power grid. For instance, the local power sources can additionally be utilized as positive secondary control power or minute reserve power.

If no connection from the local power source to the general public power grid is required, it is possible to dispense with complex control devices. In addition, the power generated locally need not be brought to the grid specification.

Local Power Source:

Useful examples of at least one local power source advantageously include power generation based on a gas turbine (GT) and/or a steam turbine (ST) and/or a fuel cell.

Gas turbines are known to those skilled in the art and are described, for example, in (C. Lechner, J. Seume (eds.): *Stationäre Gasturbinen [Stationary Gas Turbines]*, Springer, Berlin 2003). Useful fuels for the gas turbine advantageously include combustible raw materials and/or offgas streams within the respective integrated site and the respective process streams from the heat-consuming process, advantageously the reactants and/or products of the heat-consuming process.

An integrated site in the chemical industry is a production site with closed mass and energy circuits, wherein production operations, raw materials, chemical products, energy and waste streams, logistics and waste streams are networked with one another (www.basf.com/global/en/investors/calendar-and-publications/factbook/basf-group/verbund.html). An integrated site is characterized by a cascaded production chain. The variety of products increases along this cascade. An integrated power plant typically has 3 stages: in the first stage the commodities are prepared, in the second stage the intermediates, and in the third stage the specialties or end products. Each stage in this cascade may in turn consist of one or more stages. An integrated site requires the introduction of a small number of raw materials, for example LPG, naphtha, light gasoline, vacuum distillation residues, aromatics, sulfur, and also water and air and electrical energy, in order to produce thousands of different chemical compounds and formulations therefrom. The numerical ratio of the products that are prepared on an integrated site and of the raw materials used is greater than 10, preferably greater than 100, more preferably greater than 500.

Among combustible offgas streams, hydrogen-rich offgas streams are advantageous.

Examples include offgas streams from steamcracking, steam reforming, ammonia synthesis, methanol synthesis, formaldehyde synthesis, styrene production, coke production and steel production.

efficiency up to 50%. An AFC advantageously works between 20° C. and 80° C. and reaches an efficiency up to 70%.

If hydrocarbons are used as source for local power generation, the following processes are particularly advantageous: gas turbine and/or SOFC and/or MCFC. A natural gas-driven gas turbine advantageously has an inlet temperature up to 1230° C. and an efficiency up to 39%. An SOFC advantageously works at temperatures between 650° C. and 1000° C. and reaches an efficiency up to 60%. An SOFC advantageously works at temperatures between 550° C. and 700° C. and reaches an efficiency up to 55%.

Below is a tabular overview of the preferred local power sources:

| Generator type | Energy carrier | Efficiency | Advantages |
|---|---|---|---|
| Gas turbine (GT) | Natural gas, liquefied gas, synthesis gas, hydrogen, kerosene, heating oil, gas oil, heavy oil, combustible offgases | <40% | Cold start capacity[1a]<br>Wide power modulation range[1b]<br>Combinable with ST[1c] |
| Steam turbine (ST) | Superheated steam from steam grid or steam boiler | 30%-45% | Quick start capacity[2a]<br>Wide power modulation range[2b]<br>High fuel flexibility[2c]<br>Utilizes the energy from hot offgas streams[2d] |
| Polymer electrolyte membrane fuel cell (PEMFC) | Hydrogen | 50% | Cold start capacity[3a]<br>No CO2 emission[3b]<br>Wide power modulation range[3c]<br>Advantageous partial load characteristics[3d] |
| Alkaline fuel cell (AFC) | Hydrogen | 70% | Cold start capacity[4a]<br>No CO2 emission[4b]<br>Wide power modulation range[4c]<br>Advantageous partial load characteristics[4d] |
| Solid oxide fuel cell (SO FC) | Natural gas, biogas, hydrogen, synthesis gas, combustible offgases[5d] | 60% | Wide power modulation range[5a]<br>Advantageous partial load characteristics[5b]<br>Combinable with ST[5c] |
| Molten carbonate fuel cell (MCFC) | Natural gas, biogas, hydrogen, synthesis gas, combustible offgases[6d] | 55% | Wide power modulation range[6a]<br>Advantageous partial load characteristics[6b]<br>Combinable with ST[6c] |

Fuel cells are described, for example, in (Hoogers, G. (Ed.). (2002). *Fuel cell technology handbook*. CRC press.), for example polymer electrolyte membrane fuel cell (PEMFC), phosphoric acid fuel cell (PAFC), alkali fuel cell (AFC), molten carbonate fuel cell (MCFC) or solid electrolyte fuel cell (SOFC).

Also useful as local power source are oxyfuel power plants that utilize oxygen-rich offgas streams.

Alternatively or additionally, a useful local power source is the power generation from steam turbines.

If hydrogen is used as source for the local power generation, the following processes are particularly advantageous: gas turbine, SOFC and/or MCFC and/or PEMFC and/or AFC. A hydrogen-driven gas turbine advantageously works at inlet temperatures up to 1500° C. and reaches an efficiency up to 41%. An SOFC advantageously works at temperatures between 650° C. and 1000° C. and reaches an efficiency up to 60%. An MCFC advantageously works at temperatures between 650° C. and 1000° C. and reaches an efficiency up to 60%. A PEMFC advantageously works at temperatures between 50° C. and 180° C. and reaches an Gas Turbine:

(1a): The startup time from the off state to full power is advantageously from 30 seconds to 30 minutes, preferably from 60 seconds to 20 minutes, more preferably from 90 seconds to 10 minutes (example: for the SIEMENS SGT-A65 model, a cold start time up to full power of <7 min is specified).

(1b): The power is advantageously from 40% to 120% of nominal power, preferably from 50% to 110% of nominal power, more preferably from 60% to 105% of nominal power. (Ref: C. Lechner, J. Seume (eds.): Stationäre Gasturbinen, p. 190).

(1c), (5c), (6c): The offgases from these generators are so hot that the energy present therein can be utilized for the raising of steam. The steam can drive a steam turbine and generate additional electrical power. In this way, the efficiency of conversion of chemical energy to electrical energy can be distinctly increased (up to 20%). In quasi-steady-state operation, the exit temperature from a gas turbine is about 650° C. (ref: G. Lechner, J. Seume (eds.): Stationäre Gasturbinen, p. 124), that of an SOFC about 700° C., and that of an MCFC about 550° C. (ref. Wikipedia "Fuel Cell", T(op)-100K).

Steam Turbine:

(2a): The startup time of a steam turbine from a standby state is advantageously 10 minutes to 60 minutes. In the standby state, the turbine has advantageously been preheated to 300° C. and is rotated at low speed (about 1 Hz) (ref: Wikipedia "Dampfturbine").

(2b): The power is advantageously from 10% to 120% of nominal power, preferably from 20% to 110% of nominal power, more preferably from 40% to 105% of nominal power (ref: Statusbericht Flexibilitätsbedarf im Stromsektor [Status Report on Flexibility Requirement in the Power Sector], chapter 4). A steam turbine can be run down while regulating the speed until it is at absolute idling, provided that the steam supply is assured.

(2c): The steam turbine is advantageously decoupled from the combustion that provides the energy for the steam generation and steam superheating. In an integrated site, the steam turbine can advantageously be fed from the steam grid present. With this configuration, it is possible to utilize various fuels for the generation of steam. The steam can be stored in the voluminous steam grid, e.g. 10 m3 to 100000 m3, and hence can buffer variations in the availability of chemical energy.

(2d): The steam turbine generator can advantageously be coupled directly or indirectly to generator types that generate hot offgases, for example GT, SOFC or MCFC. Direct coupling means that the offgas stream from the upstream generator is used for generation of steam in the steam turbine, for example in a combined cycle power plant. "Indirectly" means that the offgas stream generates steam from the upstream generator, which is fed into the steam grid of the integrated site. The steam turbine can be fed from this grid.

Fuel Cells:

(3a), (4a): The startup time of the PEMFC and of the AFC is advantageously from 10 seconds to 15 minutes, preferably from 20 seconds to 10 minutes, more preferably from 30 seconds to 5 minutes. The PEMFC and the AFC have operating temperatures around 80° C. The kinetics of the electrode reactions at room temperature are already sufficient to generate electrical power. In an integrated site, it is advantageously possible to use waste heat streams in order to keep the fuel cells at operating temperature without difficulty.

(3b), (4b): The $CO_2$ emissions caused by the operation of PEMFC and AFC are less than 50 g of $CO_2/kW_{el}$, preferably less than 20 g of $CO_2/kW_{el}$, more preferably less than 5 g $CO_2/kW_{el}$; in particular, no $CO_2$ is emitted. The PEMFC and AFC advantageously use hydrogen as fuel.

(3c), (4c), (5b), (6b): The utilizable power range of the fuel cell generators is advantageously from 1% to 100% of maximum power, preferably from 5% to 90% of maximum power, more preferably from 10% to 70% of maximum power.

(3d), (4d), (5c), (6c): The electrical efficiency of the fuel cell generators advantageously rises in a strictly monotonous manner depending on the cell voltage, and the load advantageously rises in a strictly monotonous manner depending on the current generated. The cell voltage is at its highest at idling and declines with rising power output. This means that the efficiency of the fuel cell is higher at partial load than at full load. This characteristic is the opposite of the characteristic of turbine generators, which have the highest efficiency at full load. For that reason, the fuel cell generators have a broader utilizable power range and are suitable for continuous power control.

Startup and Shutdown of the Local Power Source:

The time for startup or shutdown of the local power source is advantageously shorter than the required response time of the minute reserve in electrical power grids (<15 minutes), preferably shorter than the required response time of the secondary control (<5 minutes) and more preferably shorter than the required response time of primary control (<30 seconds).

From stationary, the following power sources reach full load within a startup time of 15 minutes: the gas turbine generator, the PEMFC generator and the AFC generator. In addition, from stationary, the following power sources reach full load within a startup time of 5 minutes: PEMFC and AFC.

From partial load operation, all power sources listed are capable of reaching full load within a transition time of 15 minutes. In addition, from partial load operation, the following power sources reach full load within a transition time of 5 minutes: GT, PEMFC, AFC, SOFC, MCFC. In the case of the steam turbine generator, the rate of power increase is limited by the availability of steam. If the steam turbine is being fed directly from the steam grid, the steam turbine generator reaches full load with a transition time of 5 minutes. In addition, a gas turbine generator or a steam turbine generator reaches full load within 30 seconds proceeding from an operating state of advantageously 80% load, preferably 85% load, more preferably 90% load. In addition, a PEMFC generator or an AFC generator reaches full load within 30 seconds proceeding from 60% load, preferably 70% load, more preferably 80% load. In addition, an SOFC generator or an MCFC generator reaches full load within 30 seconds proceeding from 70% load, preferably 80% load, more preferably 90% load.

Proceeding from any state of operation, all the power sources listed are capable of running electrical power down to zero within 30 seconds.

Energy Carrier:

Energy carriers used for the operation of the local power sources are advantageously media that can be stored on an integrated site having adequate capacity. These media are advantageously combustible liquid or gaseous raw materials, combustible gaseous or liquid commodities for which a distribution grid is available on the integrated site, or unreactive gaseous, liquid or solid energy carriers that can store mechanical energy, tangible heat or latent heat and can be distributed over the site. These media are preferably natural gas, liquefied gas or naphtha, hydrogen, ammonia, synthesis gas, compressed air, steam or renewable solid-state storage media. The media are more preferably natural gas, hydrogen and steam.

Solid or liquid products are advantageously stored at ambient pressure or under their autogenous vapor pressure. This is because liquids are effectively incompressible.

Unlike gases and vapors: these media are compressible, meaning that their density—and hence also the energy density—increases with rising pressure.

EXAMPLES

1. Natural gas is advantageously transported below 50 bar in pipes.
2. Hydrogen is advantageously stored and distributed in the integrated system grid at two pressure levels, at 40 bar and 325 bar. The reason for the high pressure is that hydrogenations, as reactions that reduce the number of moles, are promoted by high reaction pressures.
3. Steam is advantageously stored at different pressure levels in order to utilize the pressure dependence of the boiling temperature/condensation temperature. Steam works as a heat carrier in the region of the boiling point. As a result of the phase transformation, large amounts of heat can be absorbed (in the case of evaporation) or released (in the case of condensation) with very good heat transfer and without any change in temperature. For this reason steam is stored at different pressure levels.

Each pressure level is assigned an effective temperature range:
1.5 bar→110° C.
4 bar→140° C.
6 bar→155° C.
11 bar→180° C.
16 bar→200° C.
24 bar→220° C.
40 bar→250° C.
100 bar→310° C.
117 bar→320° C.

Depending on the energy carrier, the method of the invention can be configured in different ways.

Steam as Energy Carrier

Advantageously, this configuration of the method of the invention has one or two types of local power sources. If the method of the invention has one kind of local power source, this is advantageously a gas turbine generator, a steam turbine generator, a PEMFC generator, an AFC generator, an SOFC generator or an MCFC generator. The one power source is preferably a steam turbine generator, a PEMFC generator or an AFC generator. The one power source is more preferably a steam turbine generator. When the method of the invention has two types of local power source, the first power source is advantageously a gas turbine generator, a PEMFC generator, an AFC generator, an SOFC generator or an MCFC generator, and the second power source is a steam turbine generator; preferably, the first power source is a gas turbine generator, an SOFC generator or an MCFC generator and the second power source is a steam turbine generator; more preferably, the first power source is a gas turbine generator and the second power source a steam turbine generator. Of each type of power source, one unit to ten units, preferably one unit to five units, more preferably one unit to two units, are assigned to a heat-consuming process.

In this configuration of the method of the invention, the steam turbine generator assumes a special role. The steam turbine is advantageously supplied with steam from a local steam tank, from the steam conduit of a local apparatus, or from a steam grid. The steam turbine preferably draws its steam from the steam grid of the integrated site. As a result, the steam to drive the steam turbine is permanently available and no longer limits the dynamics of the steam turbine generator like the steam boiler or the steam conduit of the evaporative condenser. The steam grid is advantageously fed from a central steam generator or from multiple steam generators that are distributed over the integrated site. The steam grid is preferably fed from at least two steam generators. More preferably, the steam grid is fed to steam generators distributed throughout the integrated site that utilize local heat sources. Steam generators may be evaporative condensers of chemical reactors or steam boilers that can be heated by means of a fuel, a combustible offgas stream or else electrically. The pressure in the steam grid is advantageously from 4 bar to 200 bar, preferably from 6 bar to 150 bar, more preferably from 8 bar to 130 bar. The temperature in the grid is advantageously from 150° C. to 700° C., preferably from 200° C. to 650° C., more preferably from 250° C. to 600° C.

The volume of the steam grid is advantageously 1000 m3 to 10 000 000 m3, preferably from 5000 m3 to 5 000 000 m3, more preferably from 10 000 m3 to 2 000 000 m3. The internal energy of the steam stored in the steam grid is advantageously from 1 MWh to 150 000 MWh, preferably from 10 MWh to 75 000 MWh, more preferably from 20 MWh to 50 000 MWh.

Hydrogen as Energy Carrier

Advantageously, this configuration of the method of the invention has one or two types of local power sources. If the method of the invention has one kind of local power source, this is advantageously a gas turbine generator, a steam turbine generator, a PEMFC generator, an AFC generator, an SOFC generator or an MCFC generator. The one power source is preferably a PEMFC generator or an AFC generator. The one power source is more preferably an AFC generator. When the method of the invention has two types of power source, the first power source is advantageously a gas turbine generator, a PEMFC generator, an AFC generator, an SOFC generator or an MCFC generator, and the second power source is a PEMFC generator or an AFC generator; preferably, the first power source is a gas turbine generator, an SOFC generator or an MCFC generator and the second power source is a PEMFC generator or an AFC generator; more preferably, the first power source is a gas turbine generator and the second power source an AFC generator. Of each type of power source, one unit to ten units, preferably one unit to five units, more preferably one unit to two units, are assigned to a heat-consuming process.

In this configuration of the invention, the low-temperature fuel cells assume a special function. The fuel cells are advantageously supplied from the hydrogen grid of the integrated site.

Hydrogen is prepared on the industrial scale by coal gasification, by the cracking of hydrocarbons, by the partial oxidation, steam reforming or autothermal reforming of natural gas, liquefied gas or naphtha, by the reforming of methanol, by the dehydrogenation of organic compounds, by water electrolysis of water, or by chlor-alkali electrolysis. Advantageously, the hydrogen is purified by pressure swing adsorption or by membrane methods, compressed and introduced into the hydrogen grid. For example, BASF's integrated site in Ludwigshafen has a 40 bar grid and a 325 bar grid for hydrogen. By means of this grid, the hydrogen is distributed to about 80 operations and some is even exported. Fuel cells that are used as local power sources can be operated in two modes: in normal mode as power generators or in inverse mode as hydrogen generators, in which case electrical power is utilized to split water into hydrogen and oxygen.

The volume of the hydrogen grid is advantageously 100 m3 to 100 000 m3, preferably from 200 m3 to 50 000 m3, more preferably from 500 m3 to 20 000 m3. The thermal energy stored in the hydrogen grid is advantageously from 250 MWh to 250 000 MWh, preferably from 500 MWh to 120 000 MWh, more preferably from 1000 MWh to 50 000 MWh.

Natural Gas as Energy Carrier

Advantageously, this configuration of the method of the invention has one or two types of local power source. If the method of the invention has one type of local power source, this is advantageously a gas turbine generator, a steam turbine generator, an SOFC generator or an MCFC generator. The single power source is preferably a gas turbine generator or an SOFC generator. More preferably, the single power source is a gas turbine generator. If the method of the invention has two types of power source, the first power source is advantageously a gas turbine generator, an SOFC generator or an MCFC generator, and the second power source is an SOFC generator or an MCFC generator; preferably, the first power source is a gas turbine generator, and the second power source is an SOFC generator. Of each type of power source, advantageously one unit to ten units, preferably one unit to five units, more preferably one unit to two units, are advantageously assigned to a heat-consuming process.

The volume of the natural gas grid is advantageously 1000 m3 to 1 000 000 m3, preferably from 2000 m3 to 500 000 m3, more preferably from 5000 m3 to 200 000 m3. The thermal energy stored in the natural gas grid is advantageously from 500 MWh to 500 000 MWh, preferably from 1000 MWh to 200 000 MWh, more preferably from 2000 MWh to 100 000 MWh. Load switch:

The method of the invention advantageously controls the source of the electrical energy with a load switch that controls the switching between the local and external power source or increasing or throttling one of the power sources. Advantageously, the proportion of the power sources can be adjusted discretely and/or continuously. Load switches are known to the skilled electrical engineer.

Advantageously, the switching is effected in discrete steps, especially in the case of partial load-incompatible local power sources. Alternatively, the switching is effected continuously, especially in the case of partial load-compatible local sources.

The control parameter used for the load switch is advantageously the price of power.

Preferably, the energy required is taken from the external power source when external power is cheaper than the locally produced power from the local power sources: for example in periods in which what is called surplus power and/or night power is available (night power being defined as that electrical energy which is supplied at night—for example between 10 p.m. and 6 a.m.—and has a low tariff).

Surplus power, according to a German parliamentary report, is defined as the difference between the electrical power that could be produced with the capacities available at a given time and the electrical power that is being used by the consumers. Surplus power is supplied on the power market at well below its generation costs or at prices lower than for a fossil fuel with the same calorific value, based on its energy content, or for free (i.e. without payment) or even at negative prices.

Preferably, on annual average, at least 25%, more preferably at least 50%, of the electrical energy is provided from the public power grid by surplus power and/or night power, preferably surplus power.

Preferably, on annual average, 25% to 100%, more preferably 50% to 100%, of the energy required from the external power source is provided by surplus power and/or night power. More preferably, however, all the energy from the external power source is provided by surplus power and/or night power, preferably surplus power.

Change in Power Sources

Advantageously, the power sources are changed during the performance of the heat-consuming process. A change in power sources is understood to mean switching-on or -off of one or more local power sources or the switching-on or -off of the external power source, especially the public power grid. In addition, a change in power sources is understood to mean increasing or throttling the proportion of one of the power sources.

Advantageously, the electrical energy supplied to the process, during the switchover, is reduced or varies by a maximum of 10% of the total power, preferably by a maximum of 5% and especially by a maximum of 1%. Advantageously, the percentage range is 10 to 0, preferably 5 to 0, especially 1 to 0. The low fluctuations can be achieved by virtue of the fast response times of the local power sources and the load switch. These response times are advantageously less than 30 minutes, preferably less than 15 minutes, more preferably less than 5 minutes.

Advantageously in accordance with the invention, the heat-consuming process maintains its state of operation during the switchover: there is advantageously a change in the conversion of the heat-consuming process during the transition time of not more than 2%, preferably not more than 1%, more preferably not more than 0.5%, especially not more than 0.2%. Advantageously, the change in the energy sources alters the by-product selectivity of the high-temperature processes only slightly; there is preferably an increase in by-product selectivity by not more than 1%, preferably by not more than 0.5%, especially by not more than 0.2% (absolute).

Reactor Concept

The endothermic method of the invention is advantageously performed in packed reactors, in tubular reactors or in light arc reactors (see Henkel, K. D. (2000). Reactor types and their industrial applications. Ullmann's Encyclopedia of Industrial Chemistry).

Heating:

There are different solutions in the prior art for providing thermal energy for a heat-consuming process via electrical power: mention should be made here by way of example of inductive or resistive methods, plasma methods, heating by electrically conductive heating elements/contact surfaces and/or microwaves.

The direct electrical supply of energy can be effected either by induction or resistance. In both cases, the reactor walls or packings in the reactor space advantageously constitute a corresponding resistance. Particular preference is given to the resistive variant since all electrical losses here that arise from the end of the supply of external power are directly to the benefit of the heating of the packings.

The packings may take the form here of a fluidized bed, moving bed or fixed bed.

In a preferred execution, two or more electrodes are installed in the packings, between which the packings function as electrical resistance and are heated on account of the electrical conduction losses as the current flows through. The current flow may either be transverse to the flow directions of the packings or longitudinal thereto.

In the case of indirect electrical energy supply, electrical heating bodies, for example heating bars or heating cartridges, are arranged over the circumference of the reactor wall or embedded into the packings. These electrical heating bodies are heated when current flows through them and release this heat to the reactor wall or to the packings surrounding it.

As well as the electrical energy sources, further non-electrical energy sources are conceivable, for example heat carriers such as flue gases, superheated vapors or melts. The tangible and/or latent heat present in the heat carriers can be transferred to the packings or to the fluid process stream via internals such as heat transfer tubes or heat pipes.

Moving Bed Reactor:

The reactor used for the method of the invention advantageously comprises a random packing of solid particles of electrically conductive material. The packing may be homogeneous or structured in terms of height. A homogeneous packing may advantageously form a fixed bed, a moving bed or a fluidized bed. A packing structured in terms of height advantageously forms a fixed bed in the lower section and a fluidized bed in the upper section. Alternatively, the structured packing advantageously forms a moving bed in the lower section and a fluidized bed in the upper section.

The carrier materials of the reactor are advantageously thermally stable in the range from 500 to 2000° C., preferably 1000 to 1800° C., further preferably 1300 to 1800° C., more preferably 1500 to 1800° C., especially 1600 to 1800° C.

The carrier materials are advantageously electrically conductive in the range between 10 S/cm and $10^5$ S/cm.

The carrier materials advantageously have a volume-specific heat capacity of 300 to 5000 kJ/(m$^3$ K), preferably 500 to 3000 kJ/(m$^3$ K).

Useful thermally resistant carrier materials, especially for methane pyrolysis, are advantageously carbonaceous materials, e.g. coke, silicon carbide and boron carbide. The supports have optionally been coated with catalytic materials. These heat carrier materials may have a different expansion capacity with respect to the carbon deposited thereon.

The carrier materials advantageously have a regular and/or irregular geometric form. Regular-shaped particles are advantageously spherical or cylindrical.

The carrier materials advantageously have a grain size, i.e. an equivalent diameter determinable by sieving with a particular mesh size, of 0.05 to 100 mm, preferably 0.1 to 50 mm, further preferably 0.2 to 10 mm, especially 0.5 to 5 mm.

Moving Bed Mode

The carrier materials are advantageously supplied in countercurrent to the reactant gases. For this purpose, the reaction space is sensibly executed as a vertical shaft, or a shaft that widens from the top downward, such that the movement of the moving bed arises under the action of gravity. However, the carrier material may also be guided through the reaction space as a fluidized bed. Both variants permit a continuous or quasi-continuous mode of operation.

The transfer resistance in heat exchange between the gas and solid packing in the heat transfer zones advantageously has a length of the transfer units, or height-of-transfer units (HTU), of 0.01 to 5 m, preferably 0.02 to 3 m, more preferably from 0.05 to 2 m, especially from 0.1 to 1 m. The definition of HTUs is adopted from http://elib.uni-stuttgart.de/bitstream/11682/2350/1/docu_FU.pdf page 74.

The heat capacity flow is the product of mass flow and specific heat capacity of a stream of matter. Advantageously, the ratio of the heat capacity flows is from 0.5 to 2, preferably from 0.75 to 1.5, more preferably from 0.85 to 1.2, especially from 0.9 to 1.1. The ratio of the heat capacity flows is adjusted via the feed streams and optionally via the side feeding or side draw removal of substreams.

Using a moving bed or fluidized bed, the temperature of the carrier on entry into the reactor is advantageously between 0 and 300° C., preferably 10 and 150° C., especially 50 to 100° C. The temperature of the reactant gases on entry into the reactor is advantageously between 0 and 100° C., preferably 10 to 50° C.

In this mode of operation, it is possible to cool down the product gases formed in the high-temperature zone very rapidly, advantageously at >200 K/s, preferably at >300 K/s, more preferably at >500 K/s, especially at >1000 K/s.

Reactor:

Advantageously, for the method of the invention of an electrically heated packed pressure-rated apparatus is performed, wherein the apparatus is advantageously divided an upper, middle and lower apparatus section. In the middle section, at least one pair of electrodes is advantageously installed in a vertical arrangement and all electrodes are advantageously disposed in an electrically conductive solid-state packing. The upper and lower apparatus section advantageously has a specific conductivity of $10^5$ S/m to $10^8$ S/m. The middle apparatus section is advantageously electrically insulated from the solid packing. The upper and lower apparatus section is advantageously electrically insulated from the middle apparatus section. The upper electrode is advantageously connected via the upper apparatus section and the lower electrode advantageously via the lower apparatus section, or the electrodes are each connected via one or more connecting elements in electrical contact with these sections.

The ratio of the cross-sectional area of the upper and lower electrodes to the cross-sectional area of the respective current-conducting connecting element or, without use of a connecting element, the ratio of the cross-sectional area of the upper and lower electrodes to the cross-sectional area of the respective current-conducting apparatus section is advantageously 0.1 to 10, preferably 0.3 to 3, especially 0.5 to 2.

Advantageously, the cross-sectional area of the electrode (for example the cross-sectional area of all electrode lands of an electrode in grid form) is in the range from 0.1 cm$^2$ to 10 000 cm$^2$, preferably 1 cm$^2$ to 5000 cm$^2$, especially 10 cm$^2$ to 1000 cm$^2$. Advantageously, the cross-sectional area of the current-conducting connecting element(s) is in the range from 0.1 cm$^2$ to 10 000 cm$^2$, preferably 1 cm$^2$ to 5000 cm$^2$, especially 10 cm$^2$ to 1000 cm$^2$. The calculation of the ratio (cross-sectional area$_{electrode(upper)}$/cross-sectional area$_{connecting\ element(upper)}$) or (cross-sectional area$_{electrode(lower)}$/cross-sectional area$_{connecting\ element(lower)}$) is illustrated in FIGS. 22 and 23.

Without use of a connecting element (between the electrode and the upper or lower apparatus section), the ratio of the cross-sectional area of the upper and/or lower electrode, preferably the upper and lower electrode, to the cross-sectional area of the respective current-conducting apparatus section is advantageously 0.1 to 10, preferably 0.3 to 3, especially 0.5 to 2.

Advantageously, the cross-sectional area of the electrode is in the range from 0.1 cm$^2$ to 10 000 cm$^2$, preferably 1 cm$^2$ to 5000 cm$^2$, especially 10 cm$^2$ to 1000 cm$^2$. Advantageously, the cross-sectional area of the upper and/or lower apparatus section is in the range from 0.1 cm$^2$ to 10 000 cm$^2$, preferably 1 cm$^2$ to 5000 cm$^2$, especially 10 cm$^2$ to 1000 cm$^2$.

The reactor packing is advantageously executed as a moving bed. Correspondingly, the reactor is advantageously divided into multiple zones. The arrangement from the bottom upward is advantageously as follows: the outlet for the carriers, the gas inlet, the lower heat transfer zone, the lower electrode, the heated zone, the upper electrode optionally with a side draw, the upper heat transfer zone, the outlet for the gaseous product stream and the feed for the carrier stream.

The lower heat transfer zone is the vertical distance between the upper edge of the gas inlet and the upper edge of the lower electrode.

The upper heat transfer zone is the vertical distance between the lower end of the upper electrode and the upper end of the solid-state packing.

The heated zone at every point in the reactor cross section is defined as the vertical distance between the lower end of the upper electrode and the upper end of the lower electrode.

Advantageously, the lower side of the upper electrode and the upper side of the lower electrode are horizontal over the entire reactor cross section. Consequently, the length of the heated zone, especially the distance between the electrodes, is advantageously uniform over the entire reactor cross section. The heated reactor cross section is advantageously from 0.005 m$^2$ to 200 m$^2$, preferably from 0.05 m$^2$ to 100 m$^2$, more preferably from 0.2 m$^2$ to 50 m$^2$, especially from 1 m$^2$ to 20 m$^2$. The length of the heated zone is advantageously between 0.1 m and 100 m, preferably between 0.2 m and 50 m, more preferably between 0.5 m and 20 m, especially between 1 m and 10 m. The ratio of the length to the equivalent diameter of the heated zone is advantageously from 0.01 to 100, preferably from 0.05 to 20, more preferably from 0.1 to 10, most preferably from 0.2 to 5.

Figure 2:
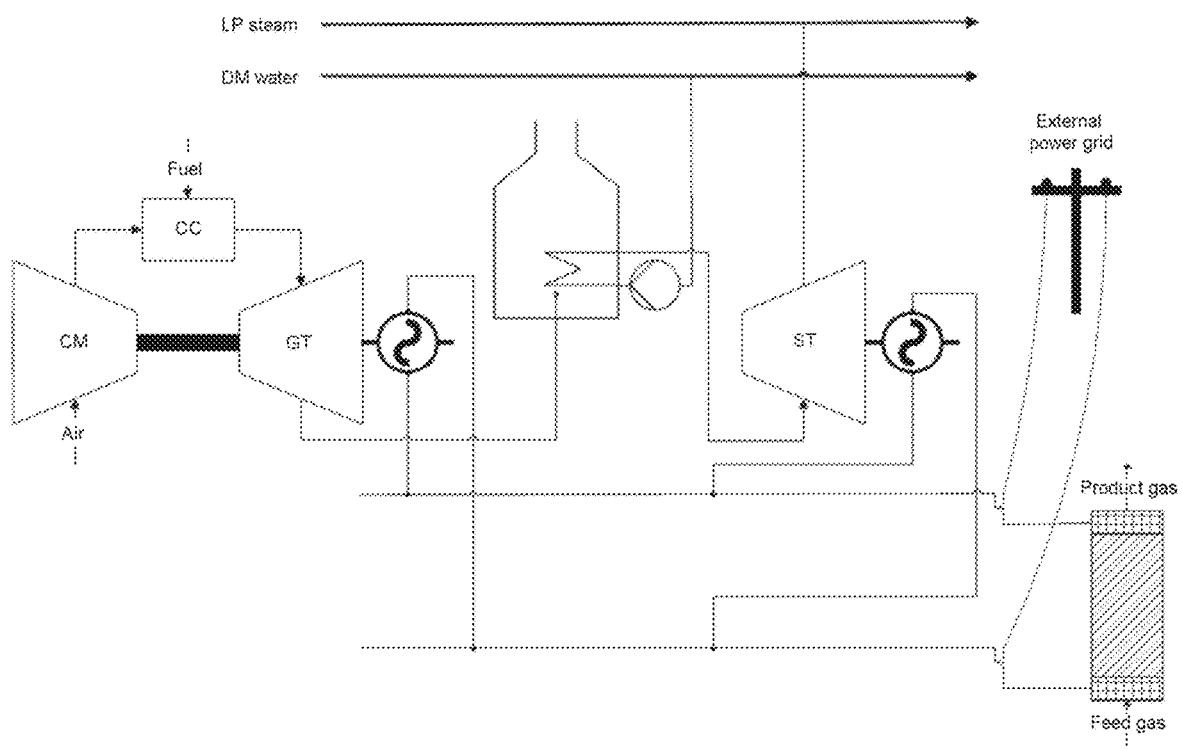
FIG. 2 shows a scheme of a comparative process.

The electrodes are advantageously positioned within the solid-state packing (see FIGS. 1 and 2). The vertical distance between the upper edge of the solid-state packing (the lowest point in the case of a slope) and the upper edge of the electrode plates or, without the use of electrode plates, the lower edge of the electrode lands at the upper electrode is advantageously from 10 mm to 5000 mm, preferably from 100 mm to 3000 mm, further preferably from 200 mm to 2000 mm. This section is advantageously from 1% to 50%, preferably from 2% to 20%, more preferably from 5% to 30%, of the total height of the solid-state packing.

The electrodes can assume all forms known to the person skilled in the art. By way of example, the electrodes take the form of grids or of bars. The electrodes preferably take the form of a grid. For the grid form, various configuration variants are conceivable: for example, grids in honeycomb form composed of advantageously regular polygons, rectangular grids formed from parallel lands, grids in spoke form or grids composed of concentric rings. Particular preference is given to grids in spoke form with advantageously 2 to 30 lands arranged in the form of a star and grids composed of concentric rings.

The cross-sectional blockage of the electrodes is advantageously between 1% and 50%, preferably between 1% and 40%, more preferably between 1% and 30%, especially between 1% and 20%.

Particular preference is given to an electrode in grid form mounted fixedly on the inside of the upper or lower apparatus section, for example a hood, or on a connecting element, for example a skirt secured to the apparatus section.

A fixed mount is understood to mean the connection of a rigid body to its environment, with the aid of which relative movement between the body and its environment is prevented in all directions.

In the case of the star-shaped and fractal-scaled grids, the electrode lands are advantageously connected to the reactor hood or to the skirt of the reactor hood at their outer end.

The contact area between the electrode and the reactor hood or skirt is advantageously between 0.1 cm$^2$ and 10 000 cm$^2$, preferably between 1 cm$^2$ and 5000 cm$^2$, especially between 10 cm$^2$ and 1000 cm$^2$.

The ratio of the cross-sectional area of the skirt of the current-conducting reactor hood to the cross section of the solid-state packing is advantageously 0.1% to 20%, preferably 0.2% to 10%, more preferably 0.5% to 5%.

In the hood-electrode unit, advantageously less than 5%, preferably less than 2%, preferably less than 1%, especially than 0.1%, of the total electrical energy introduced is dissipated. Preferably, the range of energy dissipated is 0% to 5%, preferably 0% to 2%, especially 0% to 1%. As a result, the electrical energy can be utilized virtually completely for the heating of the packing between the electrodes.

The material of the electrodes, i.e. lands and electrode plates, is advantageously iron, cast iron or a steel alloy, copper or a copper-based alloy, nickel or a nickel-based alloy, a refractory metal or an alloy based on refractory metals, and/or an electrically conductive ceramic. More particularly, the lands consist of a steel alloy, for example with materials number 1.0401, 1.4541, 1.4571, 1.4841, 1.4852, 1.4876 to DIN EN10027-2 (issue date July 2015), of nickel-base alloys, for example with materials number 2.4816, 2.4642, of Ti, especially alloys with materials number 3.7025, 3.7035, 3.7164, 3.7165, 3.7194, 3.7235. Among the refractory metals, Zr, Hf, V, Nb, Ta, Cr, Mo, W or alloys thereof are particularly advantageous; preferably Mo, W and/or Nb or alloys thereof, especially molybdenum and tungsten or alloys thereof. In addition, lands may comprise ceramics such as silicon carbide and/or carbon, e.g. graphite, where the ceramics may be monolithic or fiber-reinforced composite materials (e.g. ceramic matrix compounds, CMC, e.g. carbon fiber composite, CFC).

Endothermic Processes:

According to the invention, the heat-consuming process is advantageously an endothermic high-temperature process, preferably a process wherein the energy consumption in the reaction zone is greater than 0.5 MW/m$^3$, more preferably greater than 1 MW/m$^3$, especially greater than 2 MW/m$^3$. For example, the energy consumption may be between 0.5 and 10 MW/m$^3$ in the reaction zone.

The heat-consuming processes are advantageously conducted at an oxygen concentration of less than 5% by volume, especially less than 2% by volume, especially in an oxygen-free manner.

The maximum temperature in the reaction zone is advantageously greater than 500° C., preferably greater than 800° C. For example, the temperature in the reaction zone is within a range from 500 to 2500° C., preferably 700 to 1800° C., for example 500 to 800° C. in the case of dehydrogenation reactions, for example 700 to 1000° C. in the case of reforming reactions, for example 800 to 1100° C. in the case of steamcracking reactions, for example 800 to 1500° C. in the case of pyrolysis reactions, for example 800 to 1200° C. in the case of carbon gasification reactions.

Useful heat-consuming processes advantageously include the following processes: the preparation of synthesis gas, of hydrogen, of styrene, of olefins, especially ethylene, propylene and butene, of propene, of benzene, of acetylene, of naphthalene, of carbon monoxide, of hydrocyanic acid, of nitrogen monoxide, of hydrogen cyanide and/or of pyrolysis carbon, and in the calcination of aluminum hydroxide. Preference is given to the following methods: steam reforming and dry reforming, steamcracking or dry cracking of hydrocarbons, especially the pyrolysis of methane, ethane, propane and/or butane, the thermolysis of water, the dehydrogenation of ethylbenzene to styrene, of propane to propene, of butane to butene and/or of cyclohexane to benzene, and the pyrolytic preparation of acetylene, the preparation of benzene from methane, the reduction of carbon dioxide to carbon monoxide, the preparation of hydrogen cyanide from natural gas and nitrogen and the preparation of hydrocyanic acid from methane and ammonia, and the preparation of nitrogen monoxide from nitrogen and oxygen.

Preference is given to conducting the following high-temperature reactions, more preferably in a moving bed reactor:

the preparation of synthesis gas by reforming of hydrocarbons with steam and/or carbon dioxide, coproduction of hydrogen and pyrolysis carbon by the pyrolysis of hydrocarbons. Suitable carrier materials are especially carbonaceous granules, silicon carbide-containing granules, nickel-containing metallic granules.

Preparation of hydrogen cyanide from methane and ammonia or from propane and ammonia. Suitable carrier materials are especially carbonaceous granules.

Preparation of olefins by steamcracking of hydrocarbons. Suitable carrier materials are especially carbonaceous granules, silicon carbide-containing granules.

Coupling of methane to give ethylene, acetylene and benzene.

Preparation of olefins by catalytic dehydrogenation of alkanes, for example propylene from propane or butane from butane. Suitable carrier materials are especially silicon carbide-containing granules coated with dehydrogenation catalysts or iron-containing shaped bodies.

Preparation of styrene by catalytic dehydrogenation of ethylbenzene. Suitable carrier materials are especially silicon carbide-containing granules coated with dehydrogenation catalysts or iron-containing shaped bodies.

Preparation of diolefins by the catalytic dehydrogenation of alkanes or olefins, for example butadiene from butane or from butane. Suitable carrier materials are especially silicon carbide-containing granules coated with dehydrogenation catalysts or iron-containing shaped bodies.

Aldehydes by catalytic dehydrogenation of alcohols, for example anhydrous formaldehyde from methanol. Suitable carrier materials are especially silver-containing granules or silicon carbide-containing granules coated with dehydrogenation catalysts or iron-containing shaped bodies.

Preparation of CO by the Boudouard reaction from $CO_2$ and carbon. Suitable carrier materials are especially carbonaceous granules.

Preparation of hydrogen and oxygen by catalytic water thermolysis over catalysts. Suitable carrier materials are especially silicon carbide-containing or iron-containing granules coated with a cleavage catalyst, for example a ferrite.

Synthesis gas is advantageously used in downstream processes such as methanol synthesis, ammonia synthesis, oxo synthesis, Fischer-Tropsch synthesis ("Synthesegas" [Synthesis gas] page. In: Wikipedia, the free encyclopedia. Last edited: Mar. 10, 2020, 17:41 UTC. URL: https://de.wikipedia.org/w/index.php?title=Synthesegas&oldid=197642178).

Hydrogen is advantageously used in downstream processes such as coal hydrogenation, ammonia synthesis, fat hydrogenation, selective hydrogenation of alkynes, hydrogenation of nitro groups to amines ("Wasserstoff" [Hydrogen] Page. In: Wikipedia, the free encyclopedia. Last edited: Mar. 15, 2020, 16:31 UTC. URL: https://de.wikipedia.org/w/index.php?title=Wasserstoff&oldid=197790800).

The industrially most important olefins include ethylene, propylene and butenes. Ethylene is advantageously converted in downstream processes to conversion products such as polyethylene, ethylene dichloride, ethylene oxide, ethylbenzene ("Ethen" [Ethene] page. In: Wikipedia, the free encyclopedia. Last edited: Apr. 23, 2020, 09:31 UTC. URL: https://de.wikipedia.org/w/index.php?title=Ethen&oldid=199192096).

Propylene is advantageously converted in downstream processes to conversion products such as acetone, acrolein, acrylonitrile, acrylic acid, allyl compounds, butanol, 1-butanol, polypropylene, propylene oxide, propane-1,2-diol, propane-1,3-diol, thymol ("Propen" [Propene] page. In: Wikipedia, the free encyclopedia. Last edited: Oct. 1, 2019, 18:51 UTC. URL: https://de.wikipedia.org/w/index.php?title=Propen&oldid=192770628).

Butenes are advantageously converted in downstream processes to conversion products such as 2-butanol, 2-butanone, butadiene, methyl tert-butyl ether or ethyl tert-butyl ether ("Butene" [Butenes] page. In: Wikipedia, the free encyclopedia. Last edited: Sep. 3, 2019, 07:11 UTC. URL: https://de.wikipedia.org/w/index.php?title=Butene&oldid=191929887).

Butadiene is converted in downstream processes to conversion products such as synthetic rubber, acrylic-butadiene-styrene copolymers, adiponitrile ("1,3-Butadien" [1,3-butadiene] page. In: Wikipedia, the free encyclopedia, Last edited: May 2, 2020, 13:49 UTC. URL: https://de.wikipedia.org/w/index.php?title=1,3-Butadien&oldid=199535563).

Hydrogen is advantageously converted in downstream processes such as . . . (Häussinger, P., Lohmüller, R. and Watson, A. M. 2000. Hydrogen, 2. Production. Ullmann's Encyclopedia of Industrial Chemistry).

Benzene is converted in downstream processes to conversion products such as ethylbenzene, cumene, cyclohexane, nitrobenzene ("Benzol" [Benzene] page, In: Wikipedia, the free encyclopedia. Last edited: Apr. 20, 2020, 18:09 UTC. URL: https://de.wikipedia.org/w/index.php?title=Benzol&oldid=199100597).

Styrene is advantageously converted in downstream processes to conversion products such as polystyrene, acrylonitrile-butadiene-styrene copolymers, styrene-acrylonitrile copolymers, styrene-butadiene copolymers, acrylonitrile-styrene-acrylic ester copolymers, polyester resins ("Styrol" [Styrene] page. In: Wikipedia, the free encyclopedia. Last edited: Apr. 21, 2020, 09:59 UTC. URL: https://de.wikipedia.org/w/index.php?title=Styrol&oldid=199119904).

Hydrogen cyanide is advantageously converted in downstream processes to conversion products such as adiponitrile, acetone cyanohydrin, cyanuric chloride ("Cyanwasserstoff" [Hydrogen cyanide] page. In: Wikipedia, the free encyclopedia. Last edited: Apr. 23, 2020, 13:21 UTC. URL: https://de.wikipedia.org/w/index.php?title=Cyanwasserstoff&oldid=199198613).

Carbon monoxide is advantageously converted in downstream processes to conversion products such as phosgene, formic acid, methyl formate, acetic acid, acetic anhydride. In addition, carbon monoxide is a component of synthesis gas ("Kohlenstoffmonoxid" [Carbon monoxide] page. In: Wikipedia, the free encyclopedia. Last edited: Apr. 19, 2020, 06:01 UTC. URL: https://de.wikipedia.org/w/index.php?title=Kohlenstoffmonoxid&oldid=199031788).

Formaldehyde is advantageously converted in downstream processes to conversion products such as butane-1, 4-diol, methylene diphenyl isocyanates, polyoxymethylene, phenolic resins and amino resins ("Formaldehyd" [Formaldehyde] page. In: Wikipedia, the free encyclopedia. Last edited: May 3, 2020, 12:08 UTC. URL: https://de.wikipedia.org/w/index.php?title=Formaldehyd&oldid=199572039).

For the preferred variants of the method of the invention, the ranges for the target values for the maximum temperature are summarized in tabular form:

| Reaction | Target value for maximum temperature | | | |
|---|---|---|---|---|
| | min [° C.] | | max [° C.] | |
| | Lower limit | Preferred lower limit | Preferred upper limit | Upper limit |
| Pyrolysis (natural gas, liquefied gas, naphtha) | 800 | 1000 | 1700 | 1900 |

-continued

| Reaction | Target value for maximum temperature | | | |
|---|---|---|---|---|
| | min [° C.] | | max [° C.] | |
| | Lower limit | Preferred lower limit | Preferred upper limit | Upper limit |
| Reforming of natural gas (steam/CO2) | 600 | 750 | 1300 | 1500 |
| Alkane ammodehydrogenation | 1000 | 1200 | 1700 | 1900 |
| Steamcracking | 600 | 750 | 1300 | 1500 |
| Coupling of methane to give C2, C3 hydrocarbons | 500 | 600 | 1500 | 1800 |
| Dehydroaromatization (natural gas) | 600 | 700 | 800 | 900 |
| Dehydrogenation of propane, raffinate 11 or ethylbenzene | 450 | 500 | 650 | 700 |
| Dehydrogenation of butene to butadiene | 350 | 450 | 700 | |
| Dehydrogenation of methanol to formaldehyde | 500 | 600 | 800 | 1100 |
| Boudouard reaction | 450 | 500 | 1000 | 1300 |
| Thermolysis of water to H2 and O2 (regeneration of the catalyst) | 600 | 700 | 1100 | 1500 |

Strongly heat-consuming processes, preferably high-temperature processes, especially high-temperature processes in directly electrically heated packed reactors, are of particularly good suitability for the utilization of electrical energy since the conversion of electrical energy to heat here is possible with high exergetic efficiency caused. Exergy is the proportion of the internal energy of a system which is convertible to mechanical energy without an increase in entropy. In general, the conversion of electrical energy to heat destroys a certain proportion of the energy. This proportion reduces with rising temperature level of the heat sink, in the present case with rising temperature of the highly endothermic high-temperature process.

The products of the heat-consuming processes, especially hydrogen, synthesis gas and/or olefins, can advantageously be fed into a supply grid on the integrated site.

Secondary Regulation and Minute Reserve:

The present invention further relates to the use of the method of the invention as load shedding capacity for secondary control and/or as minute reserve for the public power grid. The method of the invention permits use of high-temperature methods as load shedding capacity for secondary control and/or as minute reserve in frequency control operations in electrical grids.

By virtue of the method of the invention, these high-temperature methods can be switched on rapidly and can also accept high amounts of energy of 300 to 600 TWh. When operated in continuous form, these methods are permanently available for the feeding of surplus power, for example of night power.

Advantages

The present invention enables sustained acceptance of surplus power by continuously operated, electrically heated heat-consuming processes. Large-scale chemical methods are thus available as load shedding capacity for secondary control and/or as minute reserve. This can improve grid stability and distinctly increase exploitation of the renewable energy sources. Moreover, the profitability of the heat-consuming processes is improved in that their load-shedding capacity is used for the benefit of grid regulation.

Moreover, the present invention enables demand-controlled load exploitation of the heat-consuming processes irrespective of the availability of surplus power in the public power grid. This improves the plannability of production in the downstream processes; the demand for storage of high-value but also highly reactive and consequently hazardous intermediates is minimized. Moreover, the supply security of the internal power sources is improved, by virtue of them being fed with energy carriers from an integrated system grid with high capacity and perturbations of individual processes being balanced out.

The directly electrically heated moving bed reactors act as an ohmic load with high heat capacity. As a result, they can also be fed from sources that do not achieve specifications for feeding into the public grid. More particularly, it is also possible to use surplus power for the heat-consuming process without intermediate storing, i.e. in a virtually loss-free manner, with an efficiency of advantageously greater than 90%, preferably greater than 95%, especially greater than 98%, i.e. within a range from advantageously 95% to 100%, preferably 98% to 100%, and hence utilize its cost advantages without significant restrictions.

As a result of the high temperature level at which the heating output is supplied, the loss of exergy in the performance of the method of the invention is preferably less than 60%, more preferably less than 50%, especially preferably less than 40%, especially less than 25%, of the electrical energy introduced.

It is thus possible for the underlying invention to serve as technology platform for the transition to electrically driven chemical processes (energy revolution). This offers the basis for the economically attractive utilization of surplus power and provision of minute reserve. A reduction in energy costs is thus possible.

An integrated site has the infrastructure to store energy carriers such as natural gas, light gasoline, hydrogen or steam in large volumes, and to utilize these without delay for the driving of appropriate power sources.

Hydrogen has the advantage of being simultaneously utilizable as commodity and as universally usable storage means for chemical energy. Hydrogen is suitable for the driving both of turbine generators and of fuel cell generators. The generation of energy from hydrogen is free of $CO_2$ emissions.

It is possible to store energy in hydrogen without loss over prolonged periods of time.

Compressed hydrogen at 40 bar has a high energy density of about 57 kWh/m$^3$, compared to about 11 kWh/m$^3$ of steam at 500° C. and 100 bar.

Steam has the advantage of being simultaneously utilizable as energy storage means and also as operating medium for driving of steam turbines. Furthermore, steam at various pressure levels is utilized for the supply of chemical engineering processes. At BASF's Ludwigshafen works, 2000 to of steam per hour is consumed. This corresponds to a power of 1300 MW, which is about twice as high as the average site demand for electrical energy. For the production of steam it is possible to utilize all fuels: combustible raw materials, combustible products, combustible offgas streams, heat from solar collectors, electrically generated heat. The gradation of the pressure levels in the steam grid allows the heat introduced to be converted to steam with high efficiency. Especially when power is being imported from the grid and the local power sources are switched off, the heat obtained from combustible offgas streams can be stored in the steam grid in the form of steam.

The use of power sources connected in parallel, where one is a steam turbine fed directly with a fuel and the second is a steam turbine fed from the steam grid, gives a very good efficiency comparable to the efficiency of combined cycle power plants.

The direct supply of the steam turbine with steam from the steam grid of the integrated site enables very rapid response of the power sources to changed demand for power.

EXAMPLES

FIG. 1 shows a schematic of a variant of the method of the invention with a directly resistance-heated fluidized bed reactor, an inductively heated fixed bed reactor, and an indirectly resistance-heated fixed bed reactor on an integrated site. Each process is fed with electrical energy both from the public power grid and from a respective local power source.

FIG. 2 shows a scheme of the comparative process according to the prior art. The internal power source is a combined cycle power plant with steam export that has the highest efficiencies among the conventional power plants. The steam turbine is connected directly to the waste heat tank of the gas turbine generator. The response behavior of the steam turbine is determined by the inertness of the waste heat tank of the gas turbine.

Figure 3:
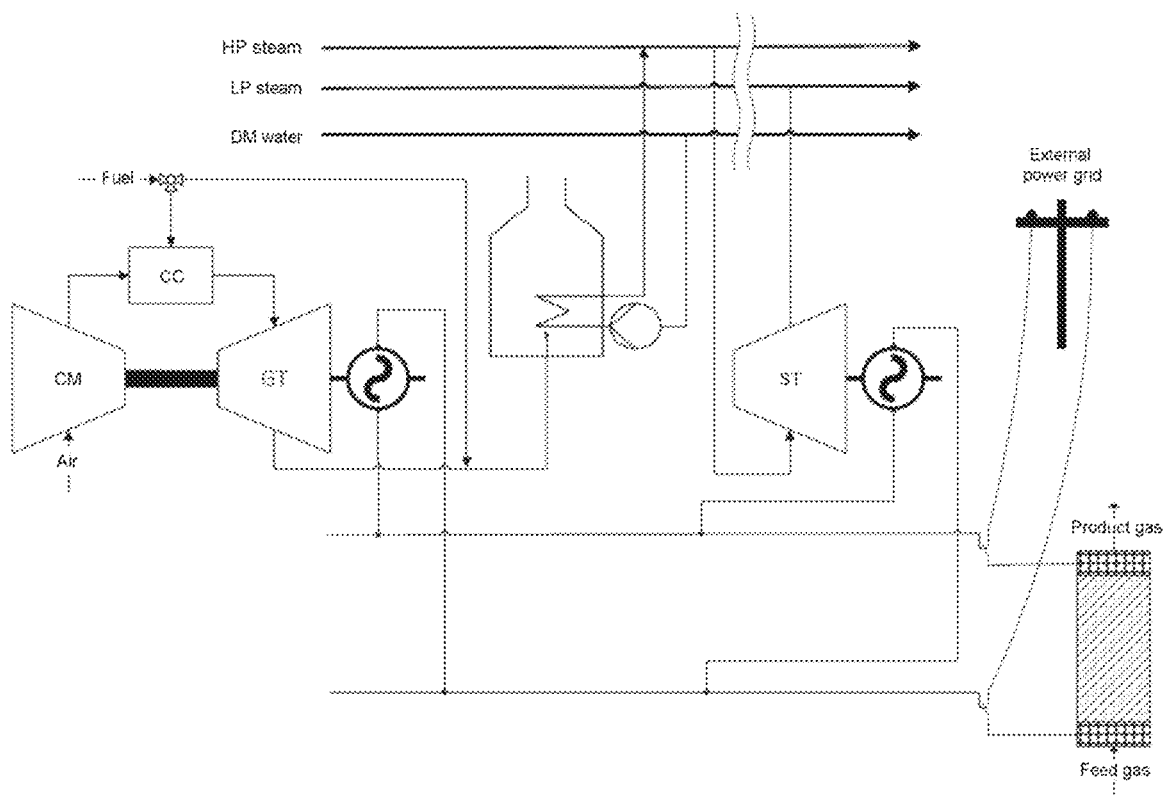
FIG. 3 shows a scheme of the process of the invention.

FIG. 3 shows a scheme of the process of the invention. The internal power source consists—identically to the combined cycle power plant—of a gas turbine generator and a steam turbine generator. The steam turbine is not connected directly to the waste heat tank of the gas turbine but to the steam grid of an integrated site. As a result, it is possible for the steam turbine to react to changing load virtually without delay.

Figure 4:
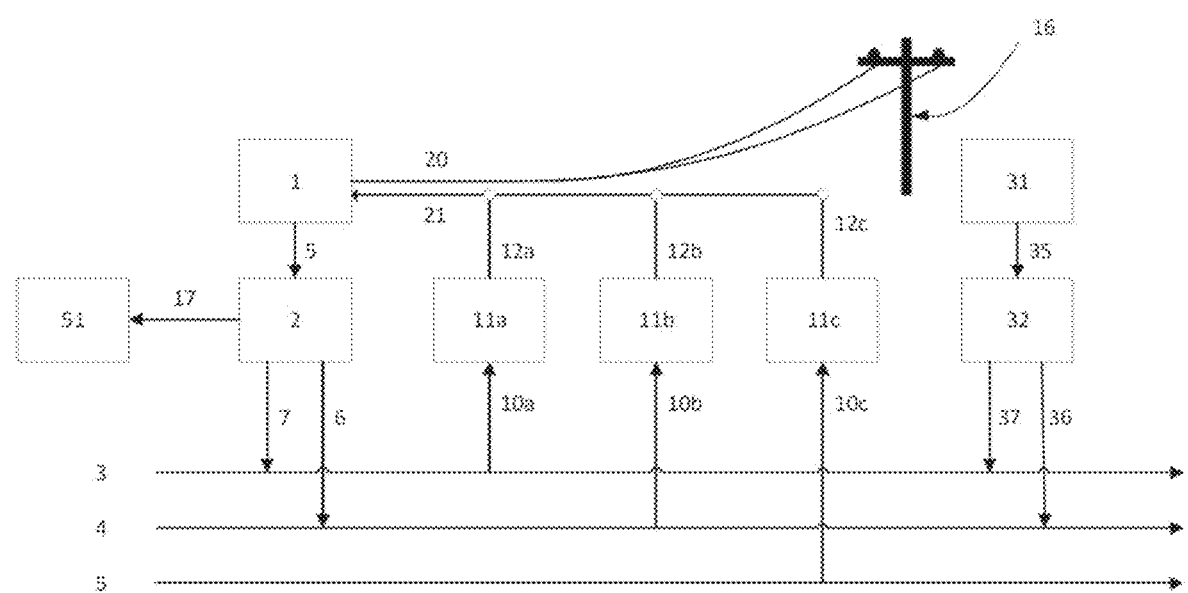
FIG. 4 shows a second scheme of the process of the invention.

FIG. 4 shows a scheme of the process of the invention. The heat-consuming process is fed from the public power grid and from local power sources. The local power sources are supplied with energy carriers from the integrated system grid. The integrated system grid stores energy carriers that are generated in the heat-consuming process and/or other processes within the integrated system. The main products of the heat-consuming process are fed to a downstream process within the integrated system.

Figure 5:
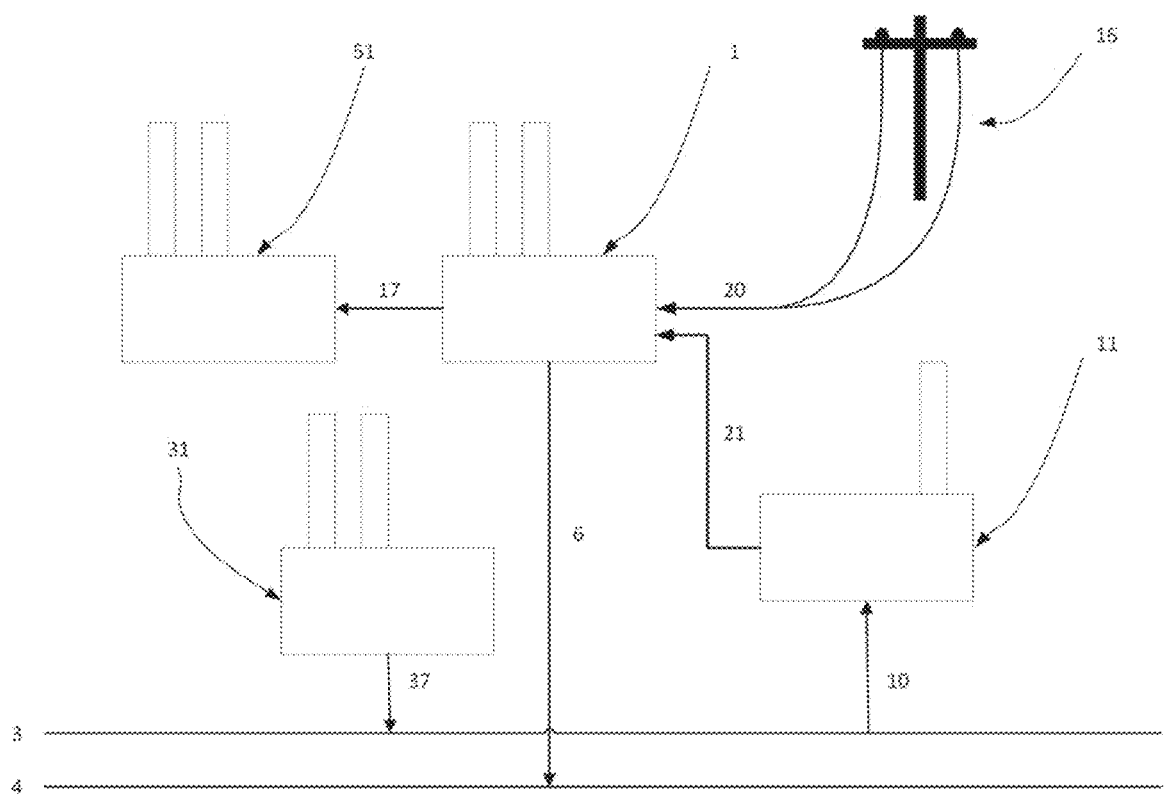
FIG. 5 shows a third scheme of the process of the invention.

FIG. 5 shows a scheme of the process of the invention. The heat-consuming process is fed from the public power grid and from a local power source. The local power source is supplied with steam from the integrated system grid. Hydrogen obtained as a by-product from the heat-consuming process is stored in the integrated system grid. The local power source is driven by means of a steam turbine generator. The hydrogen for the purpose is drawn from the integrated system grid. The main products of the heat-consuming process are fed to a downstream process within the integrated system.

LEGEND

1 Electrically heated heat-consuming process
2 Separation apparatus for removal of the main products and by-products of the heat-consuming process
3 Integrated site grid for steam
4 Integrated site grid for hydrogen
5 Integrated site grid for natural gas
6 Conduit for hydrogen-containing gas stream
7 Steam conduit
10a Conduit for supply of an internal power source with steam
10b Conduit for supply of an internal power source with hydrogen
10c Conduit for supply of an internal power source with natural gas
11a Internal power source driven with steam
11b Internal power source driven with hydrogen
11c Internal power source driven with natural gas
12a Power line from the steam-driven power source to the heat-consuming process
12b Power line from the hydrogen-driven power source to the heat-consuming process
12c Power line from the natural gas-driven power source to the heat-consuming process
16 Public power grid
17 Product conduit for the transport of the main products from the heat-consuming process to a downstream process
20 Power line for feeding of electrical power from the public grid into the heat-consuming process
21 Busbar for feeding of electrical power from the internal power sources into the heat-consuming process
31 Further process within the integrated system
32 Separation apparatus in the further process within the integrated system that removes energy carriers and introduces them into the integrated system grid
36 Conduit for hydrogen-containing gas stream from the further process within the integrated system
37 Steam conduit from the further process within the integrated system
51 Downstream process of the heat-consuming process within the integrated system Example 2

Comparative Process 1: Combined Cycle Power Plant $$\text{Combined cycle: } CH_4 + 2O_2 \rightarrow CO_2 + 2H_2O + 481 \text{ kJ}_{el}/\text{mol} \tag{1}$$

By this process, it is possible to generate electrical power from natural gas, a raw material on the integrated site, in a local power source in accordance with demand, A combined cycle generator generates 481 kJ of electrical energy per mole of methane used. At the same time, one mole of $CO_2$ is emitted. However, this process is unsuitable for storing surplus electrical energy from the grid.

Comparative Process 2: Renewable Energy in Electrolysis to Hydrogen/Reconversion in the Fuel Cell to Electrical Energy $$\text{ReGen+EL: } H_2O_{(l)} + (1/75\% * 286) \text{ kJ}_{el}/\text{mol} \rightarrow H_2 + \tfrac{1}{2}O_2 \tag{2}$$

$$\text{AFC: } H_2 + \tfrac{1}{2}O_2 \rightarrow H_2O_{(l)} + (70\% * 237) \text{ kJ}_{el}/\text{mol} \tag{3}$$

$$\text{ReGen+EL+AFC: } 381 \text{ kJ}_{el}/\text{mol} \rightarrow 166 \text{ kJ}_{el}/\text{mol} \tag{4}$$

By this process, it is possible to use electrical energy from the power grid for the production of hydrogen. The hydrogen can be fed into the pipeline grid of the integrated site. The hydrogen can be utilized physically or, if required, converted back to electrical power in a local fuel cell. About 0.44 kJ of electrical energy can be recovered per kJ of electrical energy fed into this process. This amount of electrical energy is free of $CO_2$ emissions.

Comparative Process 3: Combination of Combined Cycle and Electrolysis/Fuel Cell $$\text{ReGen+EL+AFC+CCPP: } CH4 + 2O_2 + 92 \text{ kJ}_{el}/\text{mol} \rightarrow CO_2 + 2H_2O + 521.5 \text{ kJ}_{el}/\text{mol} \tag{5}$$

Process of the Invention: Combination of Methane Pyrolysis and Hydrogen-Driven Power Source $$\text{ReGen+MePy: } CH_4+(74.8/81.3\%) \text{ kJ}_{el}/\text{mol} \rightarrow C_{(s)}+ 2H_2 \quad (6)$$

$$\text{AFC: } 2H_2+O_2 \rightarrow 2H_2O_{(l)}+(70\%*474) \text{ kJ}_{el}/\text{mol} \quad (7)$$

$$\text{GT+ST: } 2H_2+O_2 \rightarrow 2H_2O(g)+(60\%*484) \text{ kJ}_{el}/\text{mol} \quad (8)$$

$$\text{ReGen+MePy+AFC: } CH_4+O_2+(74.8/81.3\%) \text{ kJ}_{el}/\text{mol} \rightarrow C_{(s)}+H2O_{(l)}+332 \text{ kJ}_{el}/\text{mol} \quad (9)$$

$$\text{Regen+MePy+(GT+ST): } CH_4+O_2+(74.8/81.3\%) \text{ kJ}_{el}/\text{mol} \rightarrow C_{(s)}+H2O_{(g)}+290 \text{ kJ}_{el}/\text{mol} \quad (10)$$

$$\text{COPP: } C_{(s)}+O_2 \rightarrow CO_2+(45\%*393) \text{ kJ}_{el}/\text{mol} \quad (11)$$

$$\text{ReGen+MePy+AFC+COPP: } CH_4+2O_2+(74.8/81.3\%) \text{ kJ}_{el}/\text{mol} \rightarrow CO_2+2H_2O+509 \text{ kJ}_{el}/\text{mol} \quad (12)$$

$$\text{ReGen+MePy+(GT+ST)+COPP: } CH_4+2O_2+92 \text{ kJ}_{el}/\text{mol} \rightarrow CO_2+2H_2O+467 \text{ kJ}_{el}/\text{mol} \quad (13)$$

Surplus energy from renewable sources available in the external power grid is utilized for the operation of a plant for methane pyrolysis (eq. 6), The thermal efficiency of the pyrolysis based on the standard enthalpy of reaction is 81.3%. The hydrogen produced is fed into the supply grid of the integrated site. It can be utilized physically or energetically therein. The carbon produced is highly pure, inert and free-flowing. For instance, it can be transported and physically utilized or deposited in landfill. In accordance with demand, the hydrogen, simultaneously or at a different time from its production, is used for power generation in an AFC with 70% voltage efficiency (eq. 7) or in a combined gas turbine and steam turbine generator having a thermal efficiency of 60% (eq. 8). Each kilojoule of electrical energy from the external power grid which is fed into the methane pyrolysis, by virtue of the conversion of the hydrogen produced to power, depending on the local power source, can become about 3.1 kJ to 3.6 kJ of electrical energy (eqs. 9, 10) virtually free of $CO_2$ emissions. By comparison with the storage of electrical energy according to the prior art in an electrolysis fuel cell circuit, the method of the invention, through the use of methane, generates six to eight times the amount of electrical energy free of $CO_2$ emissions.

Some of the chemical energy present in the methane remains stored in the carbon coproduct and can be converted to power in a conventional thermal power plant—accompanied by $CO_2$ emissions (eq. 11). If the use of the carbon for energy purposes is allowed, the amount of electrical energy which is produced by the process consisting of methane pyrolysis with external surplus power and conversion of the hydrogen and carbon produced to power, is about 97% to 106% of the electrical energy produced by a combined cycle power plant according to the prior art with the same methane conversion (eqs. 1, 12, 13). The possible surplus in the method of the invention results from utilization of the electrical power from the external grid in methane pyrolysis.

Taking account of the total input of mass and energy, the amount of electrical energy which is produced by the method of the invention is about 90% to 98% of the electrical energy produced by a process consisting of an electrolysis/fuel cell circuit and a combined cycle power plant (eqs. 5, 12, 13).

The essential advantage of the invention is that it is possible to utilize imported electrical energy in order to use the internal power sources to produce a multiple of electrical energy free of $CO_2$ emissions.

| Process | Feed Methane | Electrical energy in kJ$_{el}$ used[2a] | generated[2b] | storable[2c] | $CO_2$ emission |
|---|---|---|---|---|---|
| Comparative process 1 | 1 mol | 0 | 481 | 0 | 1 mol |
| Comparative process 2[1] | 0 | 92 | 40 | 40 | 0 |
| Comparative process 3 | 1 mol | 92 | 521 | 40 | 1 mol |
| Process of the invention | 1 mol | 92 | 290-332 | 290-332 | 0 |
| Process of the invention + conversion of C to power | 1 mol | 92 | 467-509 | 467-509 | 1 mol |

[1]The amounts of mass and energy in eq. 2, eq. 3 and eq. 4 have been scaled such that the amounts of electrical energy imported in the comparative process and in the process of the invention are identical. As a result, the numerical values are directly comparable with one another.
[2a]The amount of electrical energy used indicates the amount of energy based on 1 mol of methane which is imported into the integrated system from the external power grid.
[2b]The amount of electrical energy generated indicates the amount of energy based on 1 mol of methane which can be generated in the local power grid from the methane used and the electrical energy used beforehand, or the products produced therefrom.
[2c]The amount of storabie electrical energy indicates the amount of energy based on 1 mol of methane that can be generated in the local power grid from products that have been produced in the integrated system with the electrical energy used beforehand.

LEGEND

AFC: alkaline fuel cell
CC: combustion chamber
ST: steam turbine
EL: electrolysis
G: generator
GT: gas turbine
CCPP: combined cycle power plant
HP steam: high-pressure steam
COPP: coal-operated thermal power plant
MePy: methane pyrolysis
LP steam: low-pressure steam
ReGen: power from renewable energy source
TPP: thermal power plant
CM: compressor
DM water: feed water for the waste heat boiler of the gas turbine

The invention claimed is:

1. A method of continuously performing at least one heat-consuming chemical process of a chemical site obtaining hydrogen, the method comprising:
   drawing electrical energy required for at least one heat-consuming process from an external power grid and from at least one local power source,
   feeding the at least one local power source from at least one local energy carrier network, to an extent of at least 50% of annual energy demand of the at least one local power source,
   feeding said at least one local power source with hydrogen that comes directly from the at least one heat-consuming process, to an extent of not more than 50% of annual energy demand of the at least one local power source,
   storing hydrogen from the at least one heat-consuming process as an energy carrier in the at least one local energy carrier network, and
   feeding a local hydrogen network with hydrogen from at least one further chemical process;
   wherein the at least one heat-consuming process is electrically heated, the maximum temperature in a reaction zone of the at least one heat-consuming process is higher than 500° C., and at least 50% of hydrogen of the at least one heat-consuming process is continuously processed further via a product conduit in downstream processes and via a conduit supplied to the local hydrogen network, and wherein a total capacity of the local hydrogen network is at least 5 GWh.

2. The method according to claim 1, wherein the at least one local energy carrier network comprises at least two different local energy carrier networks, and wherein one of the at least two different local energy carrier networks stores natural gas, naphtha, synthesis gas, or steam as an energy carrier.

3. The method according to claim 1, wherein the hydrogen from the at least one heat-consuming process as the energy carrier in the at least one local hydrogen network is distributed via associated pipe grids and storage vessels.

4. The method according to claim 1, wherein the at least one local energy carrier network bas a total capacity of at least 20 GWh.

5. The method according to claim 1, wherein the local hydrogen network is fed from a process selected from the group consisting of steamcracking, steam reforming, methane pyrolysis, styrene synthesis, propane dehydrogenation, synthesis gas production, and formaldehyde synthesis.

6. The method according to claim 1, wherein the at least one local power source is a gas turbine, a steam turbine, and/or a fuel cell.

7. The method according to claim 1, wherein the energy required by the at least one heat-consuming process is provided by electrical energy to an extent of at least 90%.

8. The method according to claim 1, wherein the at least one heat-consuming process is performed on an integrated site.

9. The method according to claim 1, wherein the at least one local power source has a startup time of shorter than 15 minutes.

10. The method according to claim 1, wherein a reactor used for the at least one heat-consuming process comprises a random packing of solid particles of electrically conductive material.

11. The method according to claim 10, wherein the at least one heat-consuming process is performed in a moving bed with countercurrent flow of a solid-state stream and a gas stream, and wherein the moving bed has a volume-specific heat capacity of 300 KJ/(m$^3$ K) to 5000 KJ/(m$^3$ K).

12. The method according to claim 1, wherein tapping from the external power grid and switching-on and -off of the at least one local power source is controlled depending on cost of power.

13. The method according to claim 1, wherein the at least one heat-consuming process is steam reforming, dry reforming, thermolysis of water, pyrolysis of hydrocarbons, and/or cracking of hydrocarbons.

14. The method according to claim 1, wherein the method provides minute reserve for a public power grid.

* * * * *